US008150920B2

(12) United States Patent
Forstadius

(10) Patent No.: US 8,150,920 B2
(45) Date of Patent: Apr. 3, 2012

(54) SYSTEM, METHOD AND COMPUTER PROGRAM PRODUCT FOR PROVIDING CONTENT TO A TERMINAL AND DIRECTING THE RENDERING OF SUCH CONTENT AT THE TERMINAL

(75) Inventor: Antti Forstadius, Espoo (FI)

(73) Assignee: Nokia Corporation, Espoo (FI)

( * ) Notice: Subject to any disclaimer, the term of this patent is extended or adjusted under 35 U.S.C. 154(b) by 782 days.

(21) Appl. No.: 10/978,861

(22) Filed: Nov. 1, 2004

(65) Prior Publication Data
US 2006/0095515 A1    May 4, 2006

(51) Int. Cl.
  *G06F 15/16* (2006.01)
(52) U.S. Cl. .................................................. 709/205
(58) Field of Classification Search .................. 709/205
  See application file for complete search history.

(56) References Cited

U.S. PATENT DOCUMENTS

| 6,624,769 | B2 | 9/2003 | Oktem et al. |
| 6,741,856 | B2* | 5/2004 | McKenna et al. ........... 455/422.1 |
| 6,992,782 | B1 | 1/2006 | Yardumian et al. |
| 7,032,030 | B1* | 4/2006 | Codignotto ................... 709/246 |
| 7,210,099 | B2* | 4/2007 | Rohrabaugh et al. ......... 715/249 |
| 2001/0052000 | A1* | 12/2001 | Giacalone, Jr. ............... 709/218 |
| 2002/0046299 | A1* | 4/2002 | Lefeber et al. ................ 709/318 |
| 2002/0089682 | A1* | 7/2002 | Yang et al. .................... 358/1.12 |
| 2002/0198941 | A1* | 12/2002 | Gavrilescu et al. ........... 709/205 |
| 2003/0225832 | A1* | 12/2003 | Ludwig ......................... 709/204 |
| 2004/0012601 | A1* | 1/2004 | Sang et al. .................... 345/581 |
| 2004/0044904 | A1 | 3/2004 | Yamazaki et al. |
| 2004/0162076 | A1* | 8/2004 | Chowdry et al. ............. 455/445 |
| 2004/0181550 | A1* | 9/2004 | Warsta et al. ............... 707/104.1 |
| 2006/0167997 | A1* | 7/2006 | Forstadius ..................... 709/204 |

FOREIGN PATENT DOCUMENTS

| EP | 1416696 A1 | 5/2004 |
| WO | WO 02/093397 A1 | 11/2002 |
| WO | WO 03/003190 A2 | 1/2003 |
| WO | WO 03/003297 A1 | 1/2003 |
| WO | WO 03/034235 A1 | 4/2003 |

OTHER PUBLICATIONS

RepliGo Products; Cerience Corporation; 2 pages; available at <http://www.cerience.com/products/index.htm> (visited Apr. 23, 2004).
SVGmaker—The SVG Printer Driver; 3 pages; available at <http://www.svgmaker.com/index/htm> (visited Apr. 23, 2004).

(Continued)

Primary Examiner — John MacIlwinen
(74) Attorney, Agent, or Firm — Alston & Bird LLP

(57) ABSTRACT

A system for directing the rendering content includes a plurality of participants and a conferencing server. The participants include a source and at least one destination that are each capable of storing content. The source is capable of operating in a fixed network environment, and at least one of the destinations comprises a mobile terminal operating in a cellular network environment. The conferencing server is capable of establishing a conference session between the participants, where one of the participants is a host of the conference session and the other participants are members of the conference session. The conferencing server is capable of receiving control events from the host, and thereafter transferring the control events to the members. The members are then capable of rendering the content stored by the respective members in accordance with the control events.

79 Claims, 11 Drawing Sheets

OTHER PUBLICATIONS

SVG Printing Requirements—W3C Working Draft Feb. 18, 2003; 9 pages; available at <http://missors.webthing.com/view=Betsie/www.w3.org/TR/SVGPrintReqs/> (visited Apr. 23, 2004).

Mobile SVG Profiles: SVG Tiny and SVG Basic, Version1.2—W3C Working Draft Mar. 25, 2004; 33 pages; available at <http://mirrors.webthing.com/view=Betsie/www.w3.org/TR/SVGMobile 12/> (visited Apr. 23, 2004).

SVG Implementations—SVG Viewers; W3C Document Formats domain; 19 Pages; available at <http://www.w3.org/Graphics/SVG/SVG-Implementations> (visited Apr. 23, 2004).

RepliGo for Nokia series 60 User Guide; Cerience Corporation; 27 pages; available at <http://www.cerience.com/docs/S60/docs/index.htm> (visited Apr. 23, 2004).

BitFlash™—Solutions; BitFlash™ Mobile document viewing; 2001; 4 pages; available at <http://www.bitflash.com/solutions/mobile_document.asp> (visited Apr. 22, 2004).

BitFlash™—Products; BitFlash™ Document Transcoder, 2001; 1 page; available at <http://www.bitflash.com/products/transcoder.asp> (visited Apr. 22, 2004).

Sharp and BitFlash Announce Mobile SVG; MobileMag.com > Mobile Phones; Dec. 2003; available at <http://www.mobilemag.com/content/100/340/C2294/> (visited Apr. 22, 2004).

New App Idea: Print to Mobile; Russell Beattie Notebook; Jan. 2, 2004; 5 pages; available at <http://www.hri.org/cgi-bin/2ascii?http%3A//www.russellbeattie.com%3A80/notebook/100> (visited Apr. 23, 2004).

International Search Report for PCT Application No. PCT/IB2005/003196.

* cited by examiner

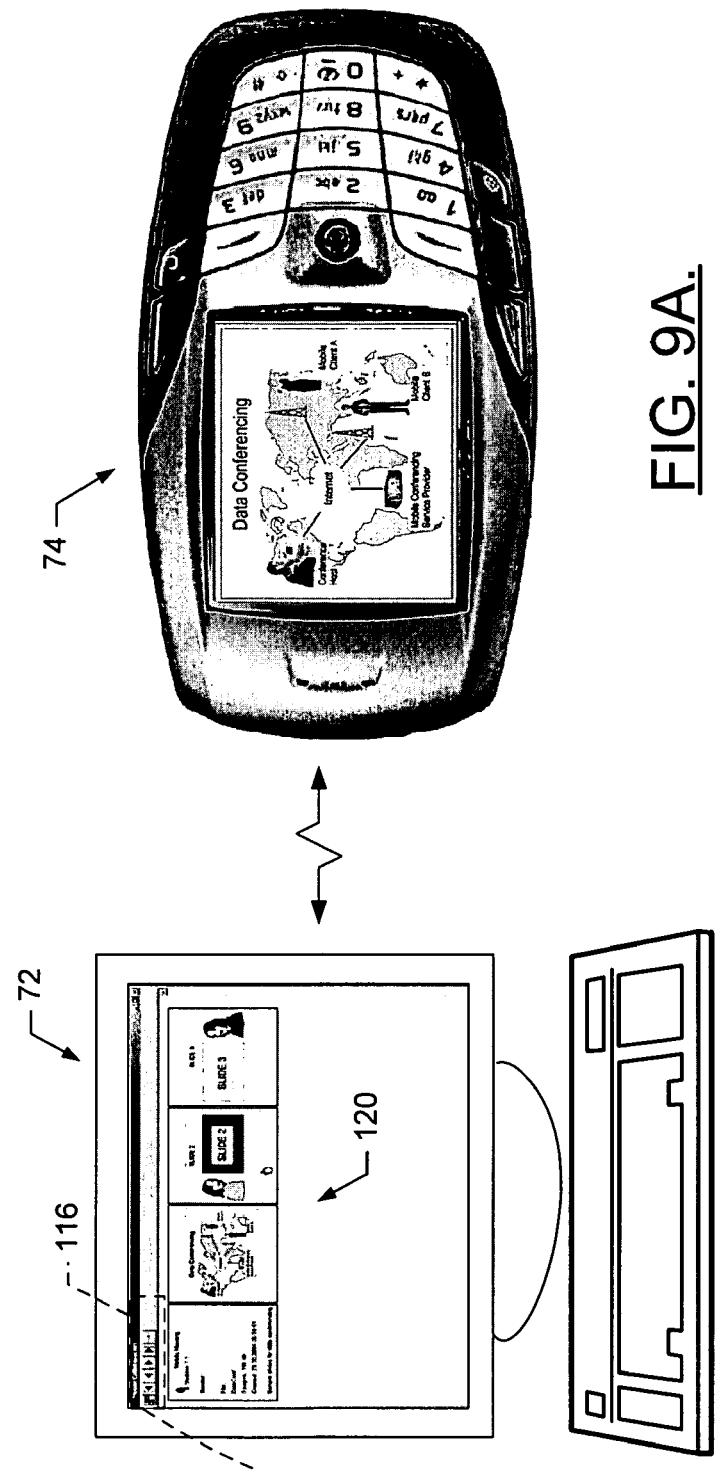

SYSTEM, METHOD AND COMPUTER PROGRAM PRODUCT FOR PROVIDING CONTENT TO A TERMINAL AND DIRECTING THE RENDERING OF SUCH CONTENT AT THE TERMINAL

FIELD OF THE INVENTION

The present invention generally relates to systems and methods of providing content to a terminal and, more particularly, relates to systems and methods of providing content to a terminal having a limited display area for presenting such content, and for directing the presentation of the content at the terminal.

BACKGROUND OF THE INVENTION

Today's business environment is increasingly dependent on information sharing as the basis for planning and decision making. Although communication can be solely verbal, its efficiency increases significantly when other modes of communication, such as visual information, are used concurrently. Visual information can be effectively used to augment verbal information and to improve the clarity and structure of the verbal communication. In the corporate environment, communication is extensively based on augmenting verbal/textual communication with visual information, e.g., in the form of e-mail attachments, printed matter and Powerpoint® presentations. Also, application sharing and workspace sharing (e.g., Microsoft Messenger®, Netmeeting®, Opentext OpenView®, etc.) are widely used in desktop conferencing for sharing material between participants.

Although images, data or other value-added information can be readily shared on computers within the corporate network, this information is generally not accessible to users who are out of the office or do not have access to their personal computers. Typically, when an employee is away from the office, he can still communicate verbally using his mobile phone, but he can not share any visual information with the calling party, which could otherwise be used to augment the voice call and add value to the conversation. Accessing such material would generally require the user to first connect to the corporate network or mail server with his laptop to retrieve and view the material. This is very impractical, however, since it would require the person to have a personal computer and wireless/wireline access to a data network, and further require him to set up the computer, log into the network and finally find and download the relevant material typically over a low bandwidth connection.

If the user has a mobile terminal such as a "smartphone" or a Communicator-type of device, the device can also be used to access additional data over e-mail in e-mail attachments. However, downloading e-mail attachments can be time consuming and expensive, since normal application files—such as Powerpoint files, images, etc.—are not optimized for mobile delivery and use, and therefore can be relatively large, thus resulting in long download times. Viewing e-mail attachments also requires that the user's mobile terminal be equipped with suitable viewing applications, which support the received application data type and version.

As can be seen from the foregoing, the present solutions for augmenting voice calls with images, data or other value added information, disadvantageously involve many pre-requisites—such as having a laptop, modem access or pre-installed viewing applications—and many phases for setting up a data connection and downloading the information. For these reasons, mobile users unfortunately have had to rely on using voice communication only or, alternatively, have had to go through the extensive and time consuming process of downloading material using a modem and laptop.

Further, images, data or other value added information are often created for rendering on a target platform, the target platform often having reasonable storage capacity, memory, bandwidth, and a large (typically at least 14-inch diagonal) display. Thus, since mobile terminals may have limited display area, resolution, and rendering capabilities, the mobile terminal may be unable to render such content as originally designed, or the mobile terminal may render the content in an extremely slow and/or inconvenient manner. Internet-enabled mobile phones, for instance, typically can display only a few lines of text, while their ability to render images may be confined to grayscale or thumbnail-sized images, or no images at all. An extreme example of a display-constrained medium is voice. In this regard, systems, such as AT&T Natural Voices™ Text-to-Speech Engine, allow users to access electronic documents by telephone, by dialing in to a service that uses text-to-speech conversion to dictate the contents of the documents over the phone. Dictation is necessarily a one-dimensional "rendering" of text, however, and cannot express the complex layout information embedded in a two-dimensional table.

Conventionally, devices are unable to render such documents as they were originally designed due to limited screen size, resolution, and rendering capabilities take liberties when called upon to render such documents. In this regard, many Internet-enabled mobile devices restrict the maximum size of a document that they can render. For instance, most Internet-enabled phones that comply with the WAP (Wireless Application Protocol) standard only support documents less than or equal to 2000 bytes. Even for those mobile devices (e.g., Pocket PC's and palm-based computers) that do not impose a strict size limit on documents, large source documents are typically broken into smaller parts because transmitting long documents at once over slow wireless networks can try the patience of users.

SUMMARY OF THE INVENTION

In light of the foregoing background, embodiments of the present invention provide an improved system, method and computer program product for providing content from a fixed network, typically, personal computer (PC), environment to a destination, such as a mobile terminal, operating in a different network and computing platform. Rendering of the content for display by the destination can then be directed or otherwise controlled from the fixed network environment. In accordance with embodiments of the present invention, content is capable of being reformatted into a scalable digital printout by means of a printing interface of a source, such as a personal computer, before being provided to a destination, such as a terminal. The digital printout can then be provided from the source to the destination through a conferencing server for rendering by the destination, such as by a display. Before providing the digital printout, however, the conferencing server can signal the destination based upon an address of the destination to thereby notify the destination of the availability of content intended for the destination. The destination can thereafter connect to the conferencing server to download the content from the conferencing server, where the conferencing server can ensure secure content delivery through authentication and through secure connectivity. Thereafter, the source and the destination can enter into a conference session via the conferencing server. During the conference session, then, a conference host (e.g., source or destination) can direct the rendering of the content by the other conference session participants.

According to one aspect of the present invention, a system is provided for directing the rendering of content. The system includes a plurality of conference participants, where the participants include a source and at least one destination that are each capable of storing content. The source is capable of operating in a fixed network environment, and at least one of the destinations comprises a mobile terminal operating in a cellular network environment. In addition to the conference participants, the system includes a conferencing server capable of interfacing between the fixed network environment and the cellular network environment. The source can be capable of transferring the content stored by the source, the content being transferred to the destinations via the conferencing server. In this regard, the conferencing server can be capable of receiving the content from the source, storing the content, and thereafter transferring the content to the destinations such that the destinations can store the content.

The conferencing server is capable of establishing a conference session between the participants, such as before and/or after the source transfers content to the destinations via the conferencing server, where one of the participants is a host of the conference session and the other participants are members of the conference session. After establishing the conference session, the conferencing server is capable of receiving at least one control event from the host, and thereafter transferring the control events to the members (and/or transferring other content to the members when the host comprises the source). The members are then capable of rendering the content stored by the respective members in accordance with the control events.

More particularly, when the source is the host and the mobile terminal is a member, the conferencing server can be capable of receiving the control events from the source at least partially across a fixed network. The conferencing server can then be capable of transferring the control events to the mobile terminal at least partially across a cellular network. Alternatively, when the mobile terminal is the host and the source is a member, the conferencing server can be capable of receiving the control events from the mobile terminal at least partially across the cellular network. Thereafter, the conferencing server can be capable of transferring the control events to the source at least partially across the fixed network.

For example, the control events can include a control event for rendering the content for display, where the host is rendering the same content for display. In such an instance, the conferencing server can be capable of transferring the control events such that the members are capable of processing at least one control event to render the content for display by the respective members. More particularly, for example, the host can be capable of presenting a user interface such that a user is capable of directing the host, by means of the user interface, to render the content for display. In response to such a direction, the host may be capable of rendering the content for display by the host. Likewise, the conferencing server may be capable of transferring the control events to permit the members to similarly render the content for display by the respective members at least partially in synch with the host.

Also, for example, the control events can include a control event for altering the rendering of the content for display, also where the host is altering the same content for display. In these instances, the conferencing server can be capable of transferring the control events such that the members are capable of processing at least one control event to alter the rendering of the content for display by the respective members. In such an instance, for example, the host and members can be capable of rendering the same content for display. The host can then be capable of presenting a user interface such that a user is capable of directing the host, by means of the user interface, to alter the rendering of the content for display. Thereafter, the host can be capable of altering the rendering by the host. The conferencing server, in turn, can be capable of transferring the control events to permit the members to similarly alter the rendering by the respective members at least partially in synch with the host.

The source can be capable of reformatting content into a vectorized format. In this regard, the source can be capable of operating a source client. In such instances, the source client can be capable of receiving the content by interfacing with the print functionality of another application capable of operating on the source. Additionally or alternatively, the source client can be capable of receiving the content by interfacing with a Graphics Device Interface (GDI) of an operating system capable of operating on the source.

The content can be reformatted in any of a number of different manners, including for example, the scalable vector graphics (SVG) format. Alternatively, the content can be reformatted into an intermediate format (e.g. PostScript format), with the conferencing server thereafter reformatting the content from the intermediate format into a vectorized format supported by the destinations, and particularly the mobile terminal. Irrespective of how the source reformats the content, the source can receive the addresses of the destinations, including a mobile terminal address (e.g., mobile telephone number, Session Initiation Protocol (SIP) address, etc.) in any of a number of different manners, such as from a source user. Alternatively, for example, the source can be capable of receiving the names of destination users, and thereafter selecting the destination addresses based upon the names.

After reformatting the content, the source can transfer the reformatted content, addresses of the destinations, and possibly a text message, to the conferencing server. In response to receiving the reformatted content and addresses, the conferencing server can be capable of signaling the destinations, the signaling including information required to access the reformatted content. In this regard, the conferencing server can be capable of signaling the mobile terminal at least partially across a cellular network, such as in accordance with the Short Messaging Service (SMS) or Session Initiation Protocol (SIP).

As will be appreciated, the conferencing server is capable of signaling the destinations such that the messaging gateway is further capable of facilitating downloading or transferring of the reformatted content to the destinations in response to receiving requests from the destinations, the requests being in response to the conferencing server signaling of the destinations. For example, the destinations can be configured to thereafter connect to the conferencing server to download the reformatted content in response to the signaling of the destinations. Before downloading the reformatted content, however, the conferencing server can be capable of authenticating the destinations based upon an identity of the destinations. More particularly, for example, the messaging gateway can be capable of authenticating the mobile terminal based upon an international mobile equipment identification (IMEI) code associated with the mobile terminal, and/or a session authentication key transferred to the mobile terminal during the signaling of the mobile terminal.

After receiving the reformatted content, the conferencing server can be capable of storing the reformatted content in memory of the conferencing server. Thereafter, upon transferring of the reformatted content to, or otherwise downloading of the reformatted content by, the destinations, the conferencing server can be capable of removing the reformatted content from the memory of the conferencing server.

In one typical embodiment, the source can be capable of transferring the reformatted content and the addresses of the destinations at least partially across an Internet Protocol (IP) network. Then, in turn, the conferencing server can be capable of signaling the mobile terminal across a cellular network, the signaling including information permitting the terminal to thereafter download the reformatted content at least partially across the cellular network.

A source, conferencing server, terminal, method and computer program product for directing the rendering of content are also provided. Embodiments of the present invention therefore provide a system, method and computer program product for directing the rendering of content. The system, source, conferencing server, terminal, method and computer program product of embodiments of the present invention are capable of reformatting content into a scalable digital printout by means of a printing interface of the source. The digital printout and addresses of the destinations can then be provided to a conferencing server. By providing the addresses of the destinations, the conferencing server can signal (e.g., using the cellular network and its services) to the destinations based upon the addresses (e.g., mobile telephone number, SIP address, etc.). In response to the signaling of the destinations, then, the destinations can download the content from the conferencing server. Thereafter, the source and destinations can enter into a conference session via the conferencing server. Thus, during the conference session, a conference host can send control events to the other conference session participants (i.e., conference members). The control events can pass through the conferencing server, and thereafter be transferred to the members such that the members can render the content in accordance with the control events. As such, the system, source, conferencing server, terminal, method and computer program product of embodiments of the present invention solve the problems identified by prior techniques and provide additional advantages.

BRIEF DESCRIPTION OF THE DRAWINGS

Figure 1:
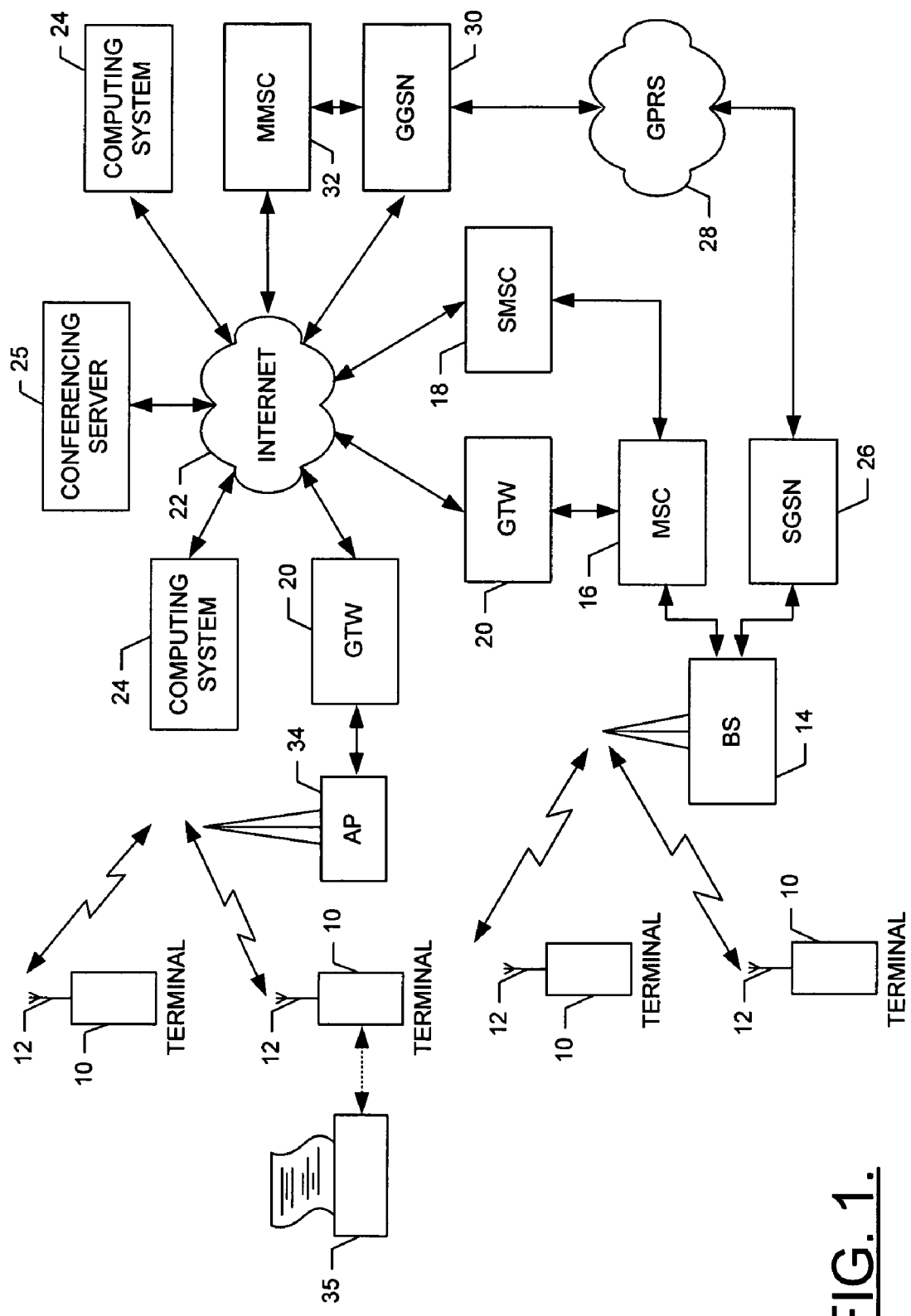
Figure 2:
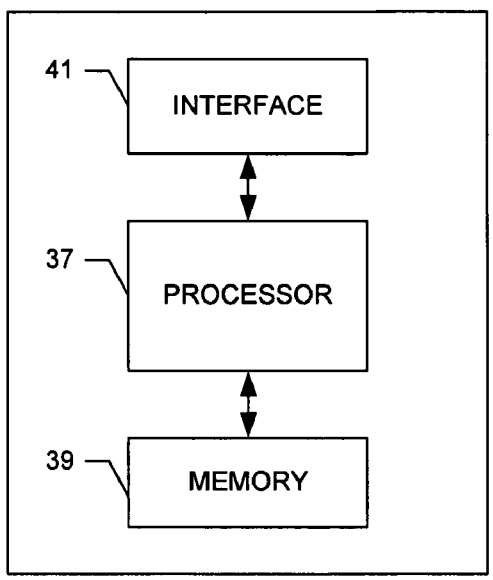
Figure 3:
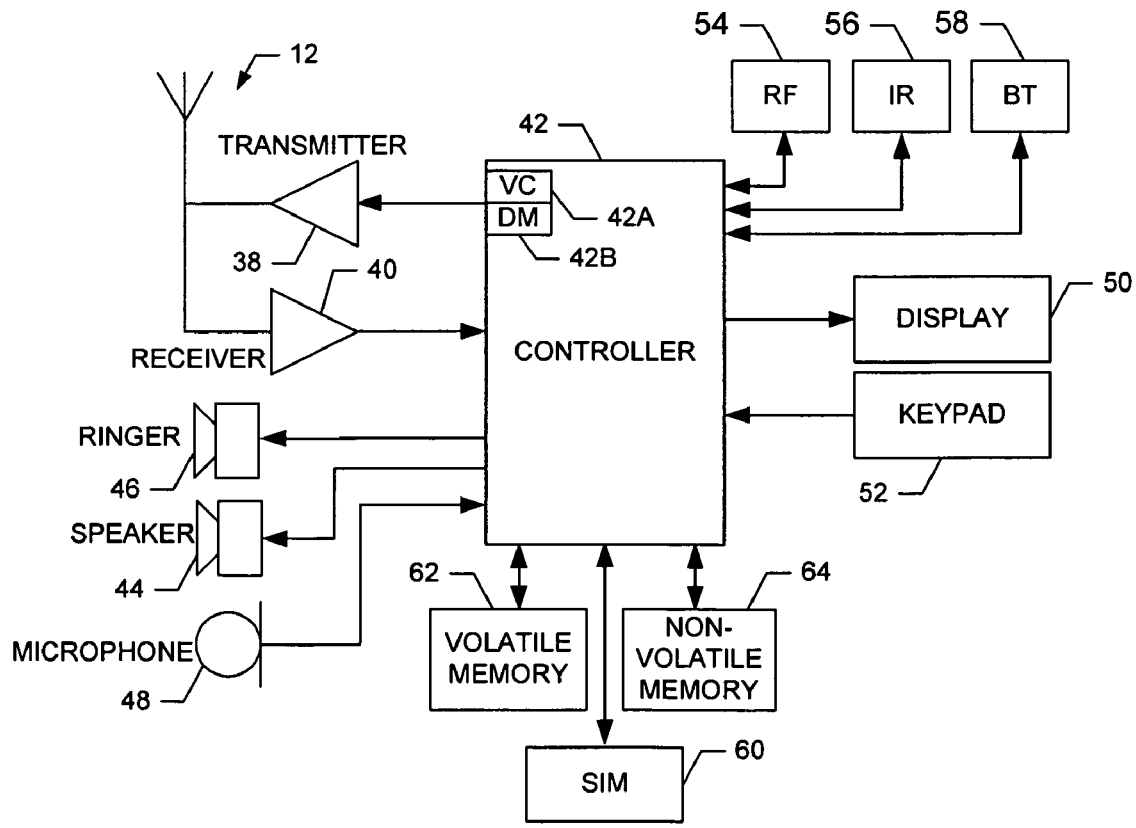
Figure 4:
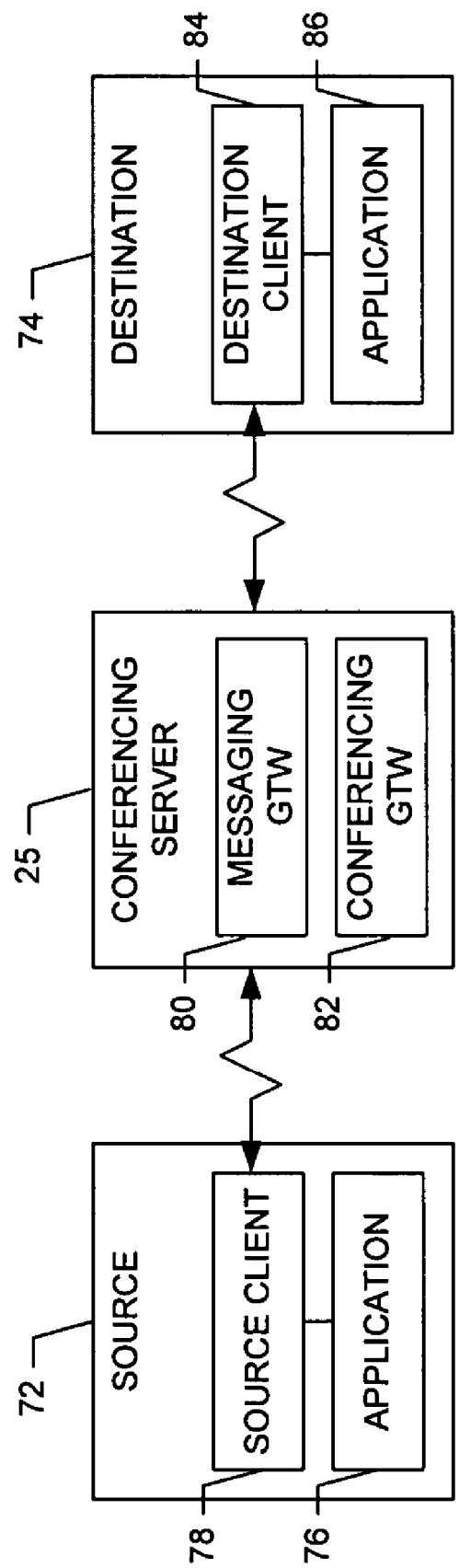
Figure 5A:
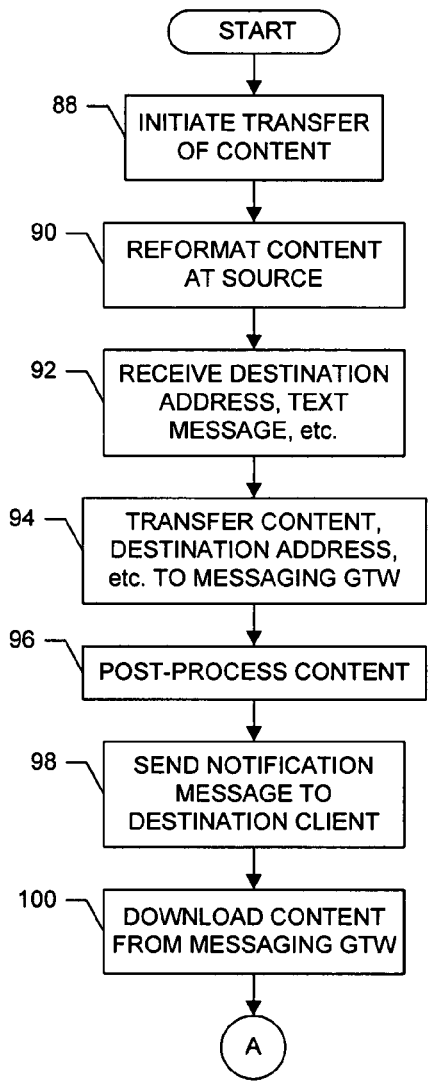
Figure 5B:
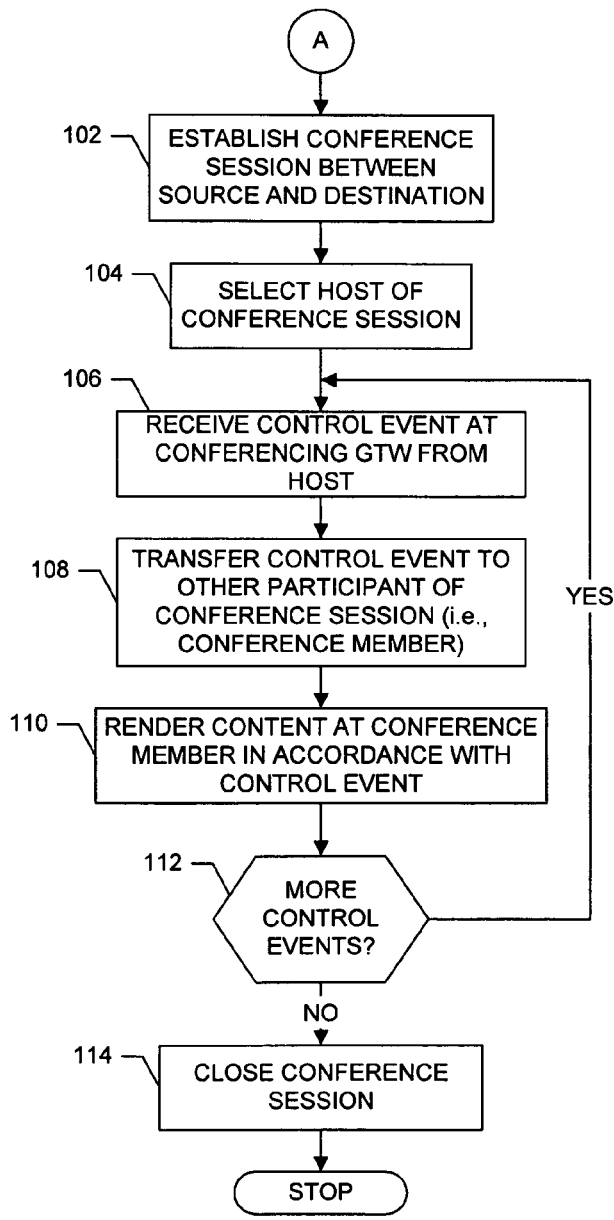
Figure 6:
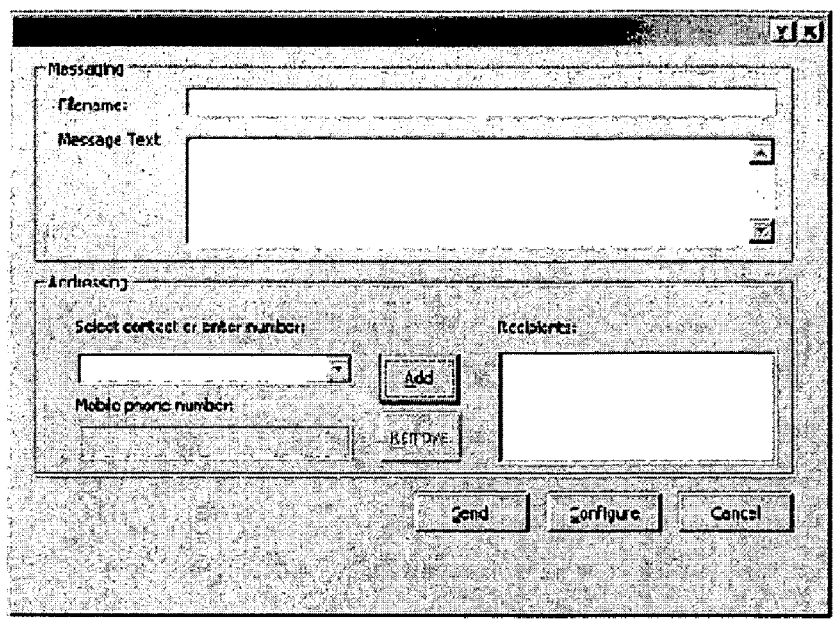
Figure 7:
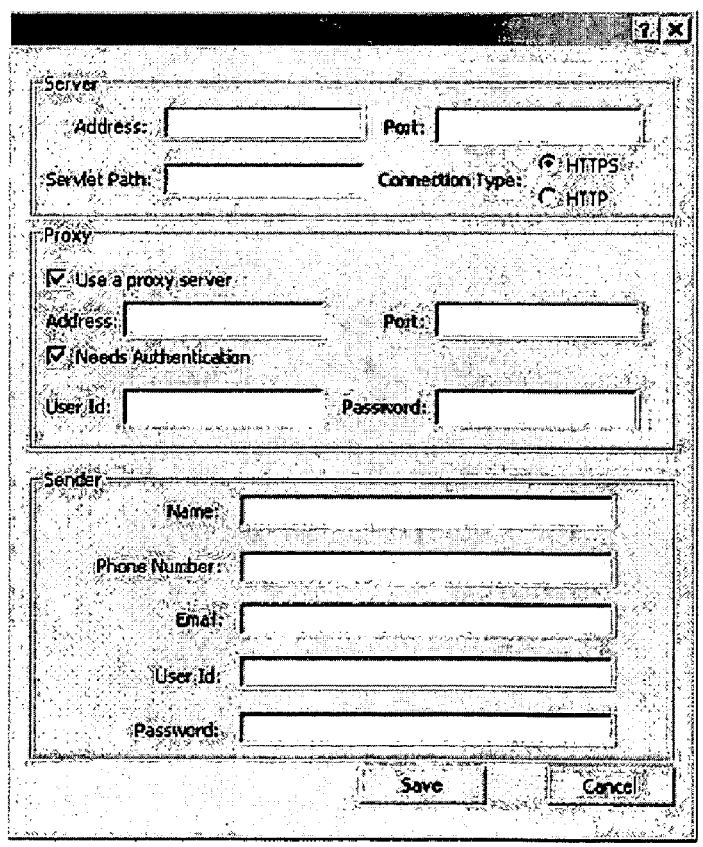
Figure 8:
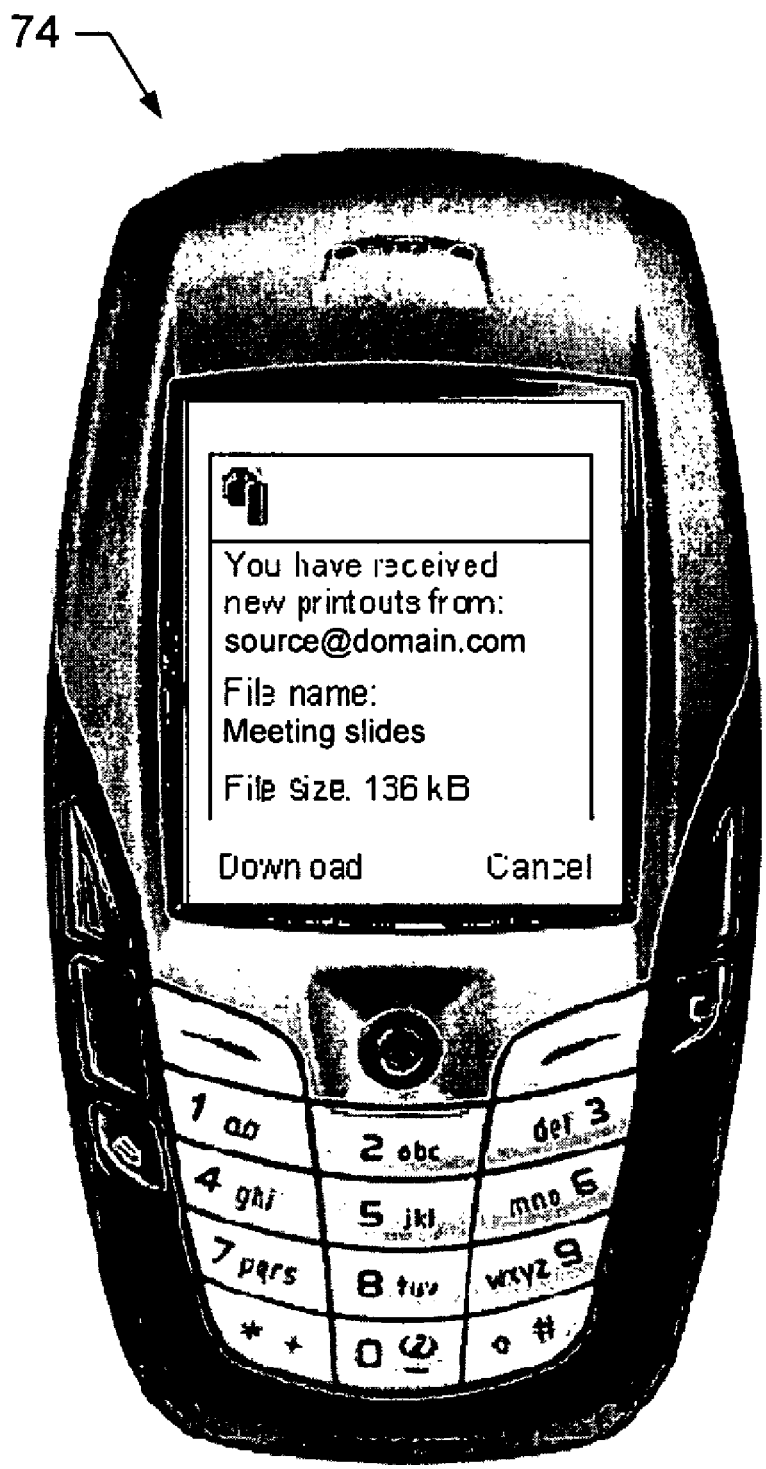
Figure 10C:
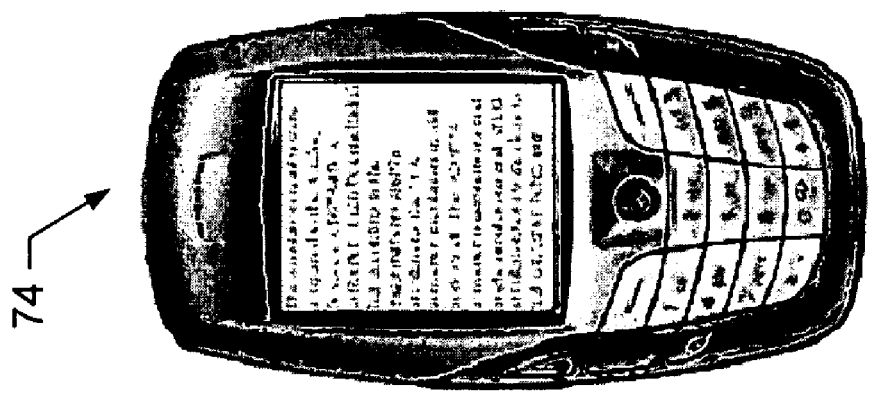
Figure 10B:
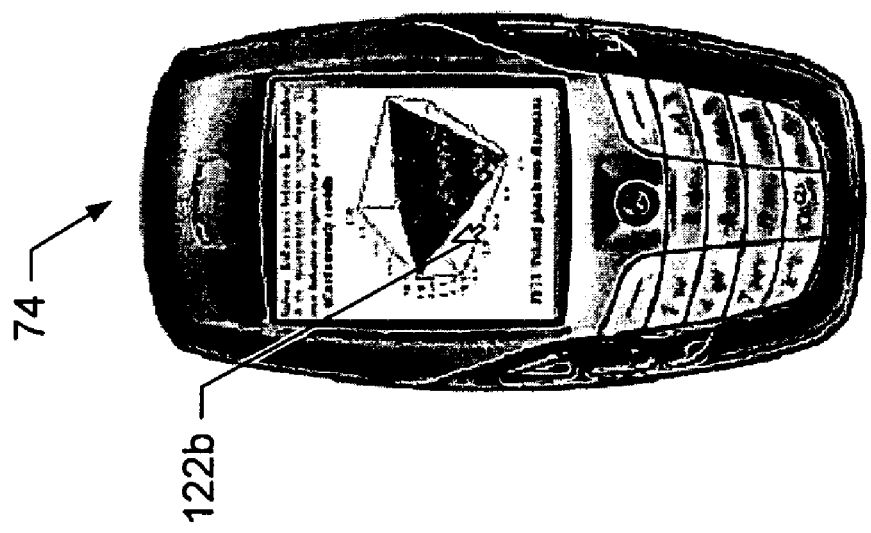
Figure 10A:
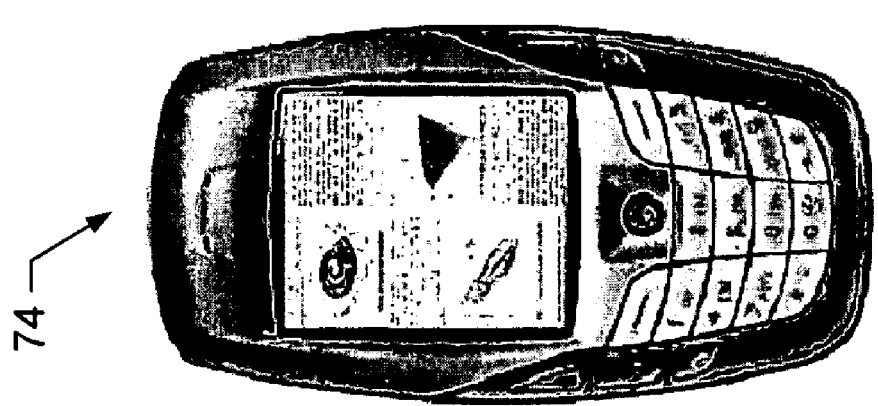
Figure 11:
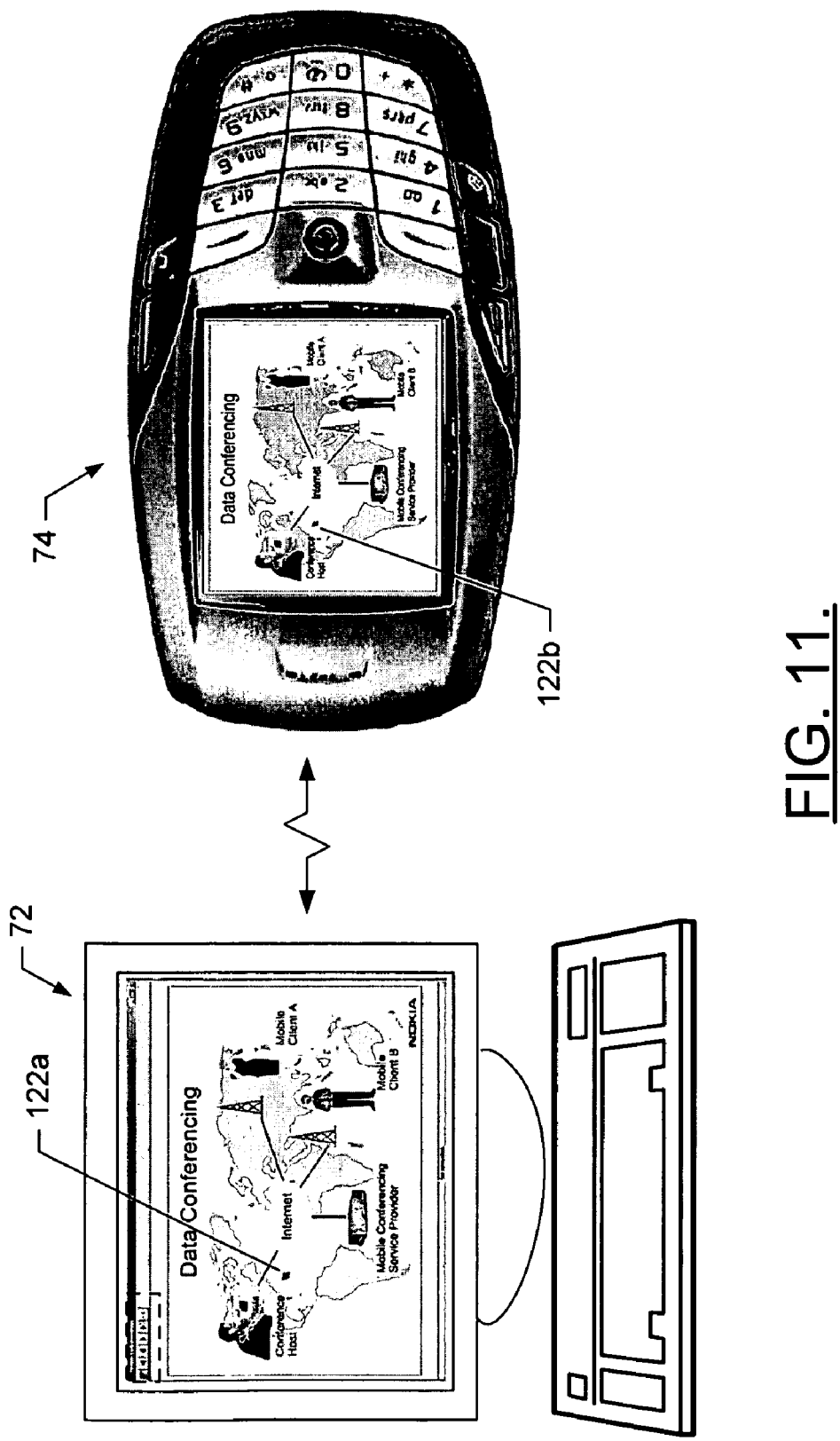
Figure 12:
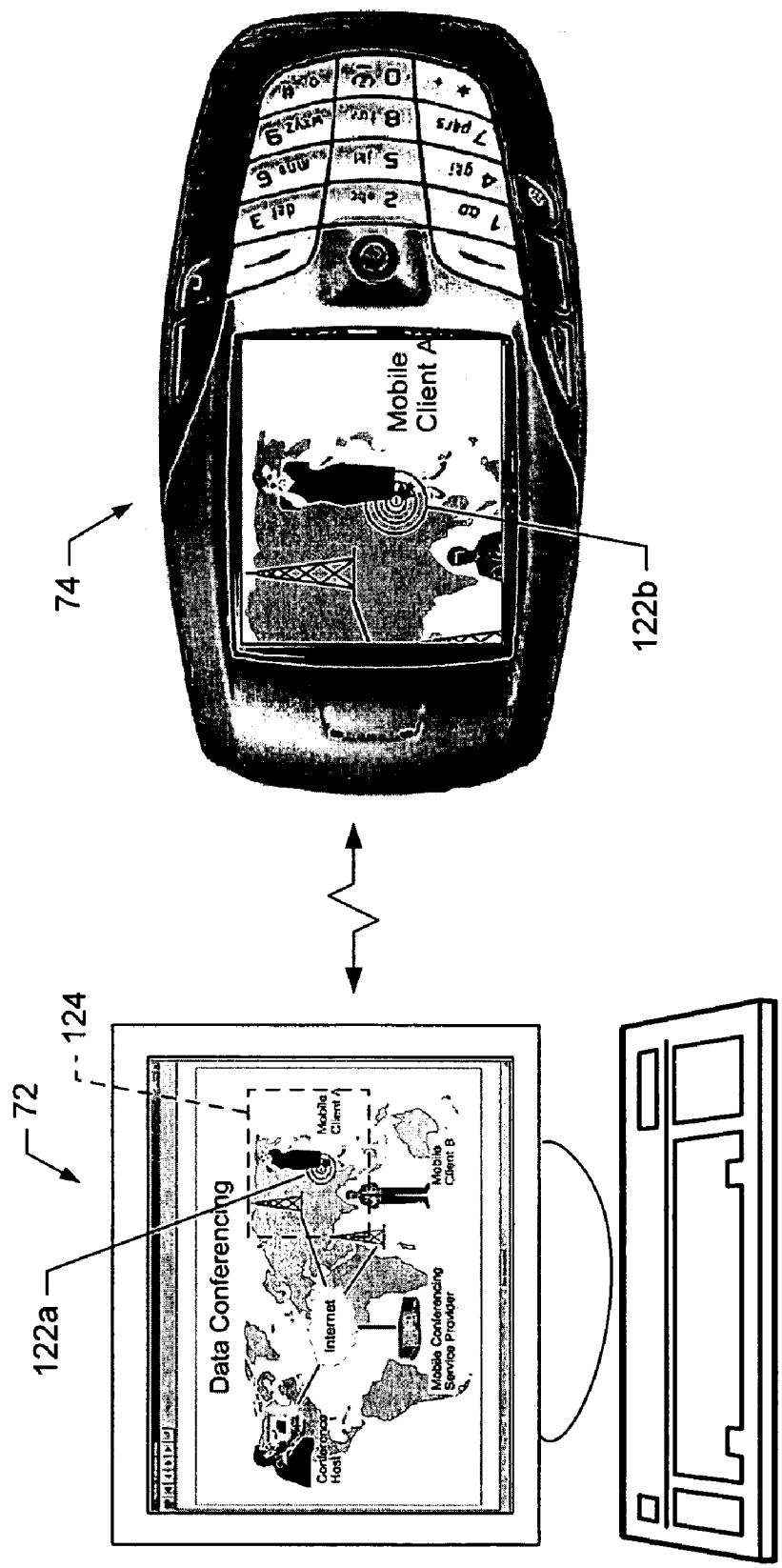
Figure 13:
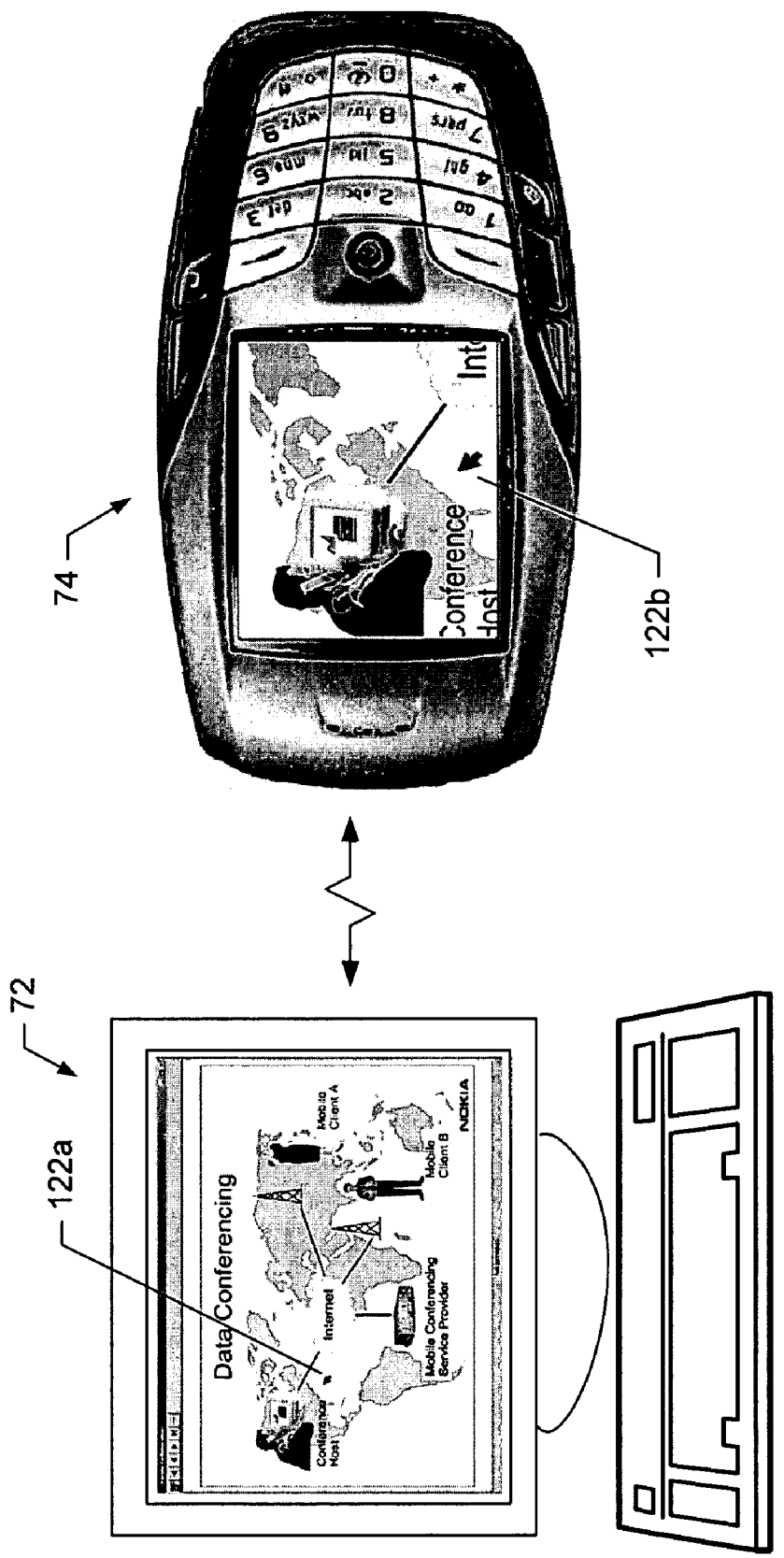

Having thus described the invention in general terms, reference will now be made to the accompanying drawings, which are not necessarily drawn to scale, and wherein:

FIG. 1 is a block diagram of one type of terminal and system that would benefit from embodiments of the present invention;

FIG. 2 is a schematic block diagram of an entity capable of operating as a terminal, computing system and/or conferencing server, in accordance with embodiments of the present invention;

FIG. 3 is a schematic block diagram of a terminal comprising a mobile station, in accordance with one embodiment of the present invention;

FIG. 4 is a functional block diagram of a source transferring content to a destination via a messaging gateway, and thereafter participating in a conference including rendering of the content, in accordance with one embodiment of the present invention;

FIGS. 5a and 5b are flowcharts illustrating various steps in a method of transferring content from a source to one or more destinations, and at least partially controlling the rendering of such content at the source and/or destination(s), in accordance with one embodiment of the present invention;

FIG. 6 illustrates a dialog box capable of being presented by a source client in transferring content to a destination, in accordance with one embodiment of the present invention;

FIG. 7 illustrates a dialog box capable of being presented in configuring a source client for operation to transfer content to a destination, in accordance with one embodiment of the present invention;

FIG. 8 illustrates a notification message being presented by a destination, the notification message notifying the destination of the availability of content intended for the destination, in accordance with one embodiment of the present invention;

FIGS. 9A and 9B illustrate exemplar displays presented by a host, source and a conference member, destination during a conference session, in accordance with one embodiment of the present invention;

FIGS. 10A, 10B and 10C illustrate different view modes of the display of content at a destination following transfer of the content to the destination, in accordance with one embodiment of the present invention; and FIGS. 11, 12 and 13 illustrate further exemplar displays presented by the host, source and the conference member, destination during the conference session of FIG. 9, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, one or more terminals 10 may each include an antenna 12 for transmitting signals to and for receiving signals from a base site or base station (BS) 14. The base station is a part of one or more cellular or mobile networks that each include elements required to operate the network, such as a mobile switching center (MSC) 16. As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center, such as short messaging service (SMS) messages to and from a SMS center (SMSC) 18.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 20, and the GTW is coupled to a WAN, such as the Internet 22. In turn, devices such as processing elements (e.g., personal computers, server computers or the like) can be coupled to the terminal 10 via the Internet. For example, as explained below, the processing elements can include one or more processing elements associated with a computing system 24 (two shown in FIG. 1), conferencing server 25 (one shown in FIG. 1) or the like, as described below.

The BS 14 can also be coupled to a signaling GPRS (General Packet Radio Service) support node (SGSN) 26. As known to those skilled in the art, the SGSN is typically capable of performing functions similar to the MSC 16 for packet switched services. The SGSN, like the MSC, can be coupled to a data network, such as the Internet 22. The SGSN can be directly coupled to the data network. In a more typical embodiment, however, the SGSN is coupled to a packet-switched core network, such as a GPRS core network 28. The packet-switched core network is then coupled to another GTW, such as a GTW GPRS support node (GGSN) 30, and the GGSN is coupled to the Internet. In addition to the GGSN, the packet-switched core network can also be coupled to a GTW 20. Also, the GGSN can be coupled to a messaging center, such as a multimedia messaging service (MMS) center 32. In this regard, the GGSN and the SGSN, like the MSC, can be capable of controlling the forwarding of messages, such as MMS messages. The GGSN and SGSN can also be capable of controlling the forwarding of messages for the terminal to and from the messaging center.

In addition, by coupling the SGSN 26 to the GPRS core network 28 and the GGSN 30, devices such as a computing system 24 and/or conferencing server 25 can be coupled to the terminal 10 via the Internet 22, SGSN and GGSN. In this regard, devices such as a computing system and/or conferencing server can communicate with the terminal across the SGSN, GPRS and GGSN. By directly or indirectly connecting the terminals and the other devices (e.g., computing system, conferencing server, etc.) to the Internet, the terminals can communicate with the other devices and with one another, such as according to the Hypertext Transfer Protocol (HTTP), to thereby carry out various functions of the terminal.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The terminal 10 can further be coupled to one or more wireless access points (APs) 34. The APs can comprise access points configured to communicate with the terminal in accordance with techniques such as, for example, radio frequency (RF), Bluetooth (BT), infrared (IrDA) or any of a number of different wireless networking techniques, including WLAN techniques. The APs 34 may be coupled to the Internet 22. Like with the MSC 16, the APs can be directly coupled to the Internet. In one embodiment, however, the APs are indirectly coupled to the Internet via a GTW 20. As will be appreciated, by directly or indirectly connecting the terminals and the computing system 24, conferencing server 25, and/or any of a number of other devices, to the Internet, the terminals can communicate with one another, the computing system, etc., to thereby carry out various functions of the terminal, such as to transmit data, content or the like to, and/or receive content, data or the like from, the computing system. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the terminal 10 to computing systems 24 across the Internet 22, the terminal and computing system can be coupled to one another and communicate in accordance with, for example, RF, BT, IrDA or any of a number of different wireline or wireless communication techniques, including LAN and/or WLAN techniques. One or more of the computing systems can additionally, or alternatively, include a removable memory capable of storing content, which can thereafter be transferred to the terminal. Further, the terminal 10 can be coupled to one or more electronic devices 35, such as printers, digital projectors and/or other multimedia capturing, producing and/or storing devices (e.g., other terminals). Like with the computing systems 24, the terminal can be configured to communicate with the portable electronic devices in accordance with techniques such as, for example, RF, BT, IrDA or any of a number of different wireline or wireless communication techniques, including USB, LAN and/or WLAN techniques.

Referring now to FIG. 2, a block diagram of an entity capable of operating as a terminal 10, computing system 24 and/or conferencing server 25, is shown in accordance with one embodiment of the present invention. Although shown as separate entities, in some embodiments, one or more entities may support one or more of a terminal, conferencing server and/or computing system, logically separated but co-located within the entit(ies). For example, a single entity may support a logically separate, but co-located, computing system and conferencing server. Also, for example, a single entity may support a logically separate, but co-located terminal and computing system. Further, for example, a single entity may support a logically separate, but co-located terminal and conferencing server.

As shown, the entity capable of operating as a terminal 10, computing system 24 and/or conferencing server 25 can generally include a processor 37 connected to a memory 39. The processor can also be connected to at least one interface 41 or other means for transmitting and/or receiving data, content or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention. In addition, when the entity comprises a conferencing server, the memory can store one or more databases. For example, the memory of a conferencing server can store a transaction database storing reformatted content from one or more sources of such content, and associating the reformatted content with a destination address and a session authentication key, as explained below. As also explained below, the memory of a conferencing server can also store a terminal database storing the addresses of one or more destinations, such as those registered with the conferencing server, associating the addresses with one or more other identifiers of the destination(s), if so desired.

Reference is now made to FIG. 3, which illustrates one type of terminal 10 that would benefit from embodiments of the present invention. It should be understood, however, that the terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

As shown, in addition to an antenna 12, the terminal 10 includes a transmitter 38, a receiver 40, and a controller 42 that provides signals to and receives signals from the transmitter and receiver, respectively. These signals include signaling information in accordance with the air interface standard of the applicable cellular system, and also user speech and/or user generated data. In this regard, the terminal can be capable of operating with one or more air interface standards, communication protocols, modulation types, and access types. More particularly, the terminal can be capable of operating in accordance with any of a number of first generation (1G), second generation (2G), 2.5G and/or third-generation (3G) communication protocols or the like. For example, the terminal may be capable of operating in accordance with 2G wireless communication protocols IS-136 (TDMA), GSM, and IS-95 (CDMA). Also, for example, the terminal may be capable of operating in accordance with 2.5G wireless communication protocols GPRS, Enhanced Data GSM Environment (EDGE), or the like. Further, for example, the terminal may be capable of operating in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 42 includes the circuitry required for implementing the audio and logic functions of the terminal 10. For example, the controller may be comprised of a digital signal processor device, a microprocessor device, and various analog-to-digital converters, digital-to-analog converters, and other support circuits. The control and signal processing functions of the terminal are allocated between these devices according to their respective capabilities. The controller can additionally include an internal voice coder (VC) 42A, and may include an internal data modem (DM) 42B. Further, the controller may include the functionally to operate one or more software programs, which may be stored in memory (described below). For example, the controller may be capable of operating a connectivity program, such as a conventional Web browser. The connectivity program may then allow the terminal to transmit and receive Web content, such as according to HTTP and/or the Wireless Application Protocol (WAP), for example.

The terminal 10 also comprises a user interface including a conventional earphone or speaker 44, a ringer 46, a microphone 48, a display 50, and a user input interface, all of which are coupled to the controller 42. The user input interface, which allows the terminal to receive data, can comprise any of a number of devices allowing the terminal to receive data, such as a keypad 52, a touch display (not shown) or other input device. In embodiments including a keypad, the keypad includes the conventional numeric (0-9) and related keys (#, *), and other keys used for operating the terminal. Although not shown, the terminal can include a battery, such as a vibrating battery pack, for powering the various circuits that are required to operate the terminal, as well as optionally providing mechanical vibration as a detectable output.

The terminal 10 can also include one or more means for sharing and/or obtaining data. For example, the terminal can include a short-range radio frequency (RF) transceiver or interrogator 54 so that data can be shared with and/or obtained from electronic devices in accordance with RF techniques. The terminal can additionally, or alternatively, include other short-range transceivers, such as, for example an infrared (IR) transceiver 56, and/or a Bluetooth (BT) transceiver 58 operating using Bluetooth brand wireless technology developed by the Bluetooth Special Interest Group. The terminal can therefore additionally or alternatively be capable of transmitting data to and/or receiving data from electronic devices in accordance with such techniques. Although not shown, the terminal can additionally or alternatively be capable of transmitting and/or receiving data from electronic devices according to a number of different wireless networking techniques, including WLAN techniques such as IEEE 802.11 techniques or the like.

The terminal 10 can further include memory, such as a subscriber identity module (SIM) 60, a removable user identity module (R-UIM) or the like, which typically stores information elements related to a mobile subscriber. In addition to the SIM, the terminal can include other removable and/or fixed memory. In this regard, the terminal can include volatile memory 62, such as volatile Random Access Memory (RAM) including a cache area for the temporary storage of data. The terminal can also include other non-volatile memory 64, which can be embedded and/or may be removable. The non-volatile memory can additionally or alternatively comprise an EEPROM, flash memory or the like. The memories can store any of a number of pieces of information, and data, used by the terminal to implement the functions of the terminal. For example, the memories can store an identifier, such as an international mobile equipment identification (IMEI) code, international mobile subscriber identification (IMSI) code, mobile station integrated services digital network (MSISDN) code (mobile telephone number), Session Initiation Protocol (SIP) address or the like, capable of uniquely identifying the mobile station, such as to the MSC 16. As explained below, the memories can also store one or more applications capable of operating on the terminal.

As explained in the background section, in various instances a user may desire to access or otherwise view a document through a medium for which the document was not originally designed. For example, a user may desire to view a document through a terminal 10 that may have limited display area, resolution, and rendering capabilities and may be unable to render such documents as they were originally designed, or they may render them in an extremely slow and/or inconvenient manner. Thus, in accordance with embodiments of the present invention, a source (e.g., personal computer) capable of operating in a fixed network environment (e.g., LAN, MAN, WAN, etc.) is capable of reformatting content into a scalable digital printout by means of a printing interface at the source before being provided to one or more destinations (e.g., personal computers, terminals, etc.) capable of operating in the fixed network environment or a cellular network environment (e.g., TDMA, GSM, CDMA, GPRS, EDGE, MBMS, DVB, CSD, HSCSD, etc.). The digital printout can then be provided to the destination(s) based upon an address of the destination and through a conferencing server 25, which is capable of interfacing between the fixed network environment and the cellular network environment for those destination(s) operating in the cellular network. Thereafter, the destination can be capable of rendering the content, such as by a display (e.g., display 50). Before providing the digital printout, however, the conferencing server can notify the destination of the availability of content intended for the destination. The destination can thereafter download the content from the conferencing server.

As will further be appreciated, in various instances the source and destination(s) may desire to engage in a conference in which the content sent by the source and received by the destination(s) is used to augment a verbal communication between the source and destination(s). Thus, before and/or after receiving the digital printout, a conference session can be established between the source and the destination(s) via the conferencing server 25. During the conference, a host may be selected from the conference participants, including the source and destination(s), the other conference participants being referred to as conference members. The conferencing server can receive control events from the host, where the control events direct rendering of the content sent by the source and received by the destination(s). The conferencing server can then transfer those control events to the conference members. Accordingly, the conference members can render the content in accordance with the host's control events. The host can thereby direct rendering of the content locally at the host, and can also at least partially direct rendering of the content remotely at the conference members.

Reference is now drawn to FIG. 4, which illustrates a functional block diagram of a source 72 of content providing or otherwise transferring one or more pieces of content to one or more destinations 74 (one being shown) and participating in a conference including rendering of the content where, of the conference participants, the source is capable of operating in a fixed network environment and the destinations are capable of operating in the fixed network environment and/or a cellular network environment. As shown, the source is capable of operating one or more source applications 76, such as content viewers and/or editors. The content can comprise any of a number of different types of content including, for example, presentation slides, spreadsheets, clipboard data, images in various graphics formats (e.g., JPG, GIF, BMP, etc.), screenshots, documents and the like. Thus, the content viewer and/or editor can comprise any of a number of different applications capable of rendering the content for display by the source.

To permit the source 72 to transfer content to the destination 74 in accordance with embodiments of the present invention, the source is also capable of operating a source client 78. The source client of one embodiment includes or is otherwise in communication with a printer driver, such as a printer driver configured in accordance with the Microsoft® Windows® operating system. In such an embodiment, the source client is capable of directly interfacing with the printing functionality of the content viewer and/or editor application 76 operating on the source. Briefly, the source client is capable of interfacing with a printing functionality of application 76 to thereby reformat the content into a vectorized format, such as by implementing or otherwise communicating with a graphics filter. The source client can reformat the content into any of a number of different vectorized formats. In one typical embodiment, for example, the source client can reformat the content into a SVG (scalable vector graphics) format or any derivatives of the like (e.g., Mobile SVG, SVG-Tiny, SVG-Basic, etc.). In addition to reformatting the content, the source client can request, and thereafter receive, an address or other identity of the destination such that the vectorized content can be transmitted to the destination based upon the address of the destination.

After reformatting the content and receiving the address of the destination 74, the source 72 can establish a communication session with a conferencing server 25, which can interface between the source and destination. In this regard, the source can establish a communication session such that the source client 78 can transfer the reformatted content and destination address to the conferencing server. Generally, the messaging gateway handles post-processing of the content and delivery of the content to the destination, as well as control, during a conference between the source and destination, of a conference host directing the rendering of the content by the other participants of the conference (i.e., conference members). If so desired, the conferencing server can also perform tasks related to user/client authentication, user registration, user account management, transaction logging and billing/collection of source user transaction data. It is also possible to use a web server in the conferencing server for distributing the source and destination clients 78, 80 to the source 72 and destination, respectively, and for providing tools for user registration and setting up user accounts. As described herein, the source and conferencing server comprise separate entities. It should be understood, however, that a single entity may support a logically separate, but co-located, source and conferencing server, without departing from the spirit and scope of the present invention.

More particularly, the conferencing server 25 can include a messaging gateway (GTW) 80 and a conferencing gateway (GTW) 82. Upon receipt of the reformatted content and destination address at the conferencing server 25, then, the messaging gateway can communicate with the destination 74 based upon the address of the destination, to thereby effectuate the transfer of the reformatted content to the destination. In this regard, the destination is capable of operating a destination client 84 capable of communicating with the messaging gateway to receive the reformatted content from the messaging gateway. For example, as explained below, the messaging gateway can send a notice, such as an SMS (short messaging service) message, to the destination client to thereby inform the destination client of the availability of the reformatted content. Thereafter, the destination can establish a communication session with the conferencing server to thereby permit the destination client to download the reformatted content from the messaging gateway. Upon downloading the reformatted content, the destination client can be capable of rendering the reformatted content for display by the destination. Alternatively, as shown, the destination client can be capable of communicating with one or more destination applications 86, such as content viewers and/or editors, capable of rendering the reformatted content for display by the destination.

Before and/or after the source client 78 transfers the content to the conferencing server 25, the conferencing gateway 82 of the conferencing server can establish a conference session between the source 72 and the destination 74 via the conferencing gateway. A host for the conference session can be selected from the conference participants, with the other conference participants being referred to as conference members. Thereafter, the host can at least partially direct the rendering of the content. In this regard, the host client (e.g., source client) can send the conferencing gateway one or more control events during the conference session, the control events directing the rendering, or some aspect of the rendering, of the content. The conferencing gateway can then transfer those control events to the clients of the members of the conference session (e.g., destination client). Upon receipt of the control events, the clients of the conference members can render the content in accordance with the control events.

As shown and described herein, the source application 76 and source client 78, the messaging gateway 80 and conferencing gateway 82, and the destination client 84 and destination application 86 each comprise software operated by the source 72, conferencing server 25 and destination 74, respectively. It should be understood, however, that the source application, source client, messaging gateway, conferencing gateway, destination client and/or destination application can alternatively comprise firmware or hardware, without departing from the spirit and scope of the present invention. Also, although the source application and source client, the messaging gateway and conferencing gateway, and the destination client and destination application are shown and described as being local to the source, conferencing server and destination, respectively, any one or more of the source application and source client, the messaging gateway and conferencing gateway, and the destination client and destination application can alternatively be distributed from, and in communication with, the source, conferencing server and destination, respectively, such as across the Internet 20. Further, as shown and described herein, content is provided or otherwise transferred from a source to a destination. It should be understood, however, that the terms "providing" and "transferring" can be used herein interchangeably, and that providing or transferring content can include, for example, moving or copying content, without departing from the spirit and scope of the present invention.

The system, method and computer program product of embodiments of the present invention will now be described in more detail with respect to a source 72 providing or otherwise transferring content to a destination 74, and the host of a conference between the source and destination at least partially directing the rendering of the content by the other conference participant (i.e., conference member). As described herein, a source can comprise any entity (e.g., terminal 10, computing system 24, etc.) functioning in accordance with embodiments of the present invention to transfer one or more pieces of content to one or more destinations. The destination, on the other hand, can comprise any entity (e.g., terminal, computing system, etc.) functioning in accordance with embodiments of the present invention to receive content from the source and thereafter render the content for display, if so desired. As will be further appreciated, although functionally operating in different manners, the same entity can, at different times, function as a source, destination or both a source and a destination.

Reference is now drawn to FIGS. 5a and 5b, which illustrate a flowchart including various steps in a method of transferring content from a source to one or more destinations, such as one or more terminals 10 and/or computing systems 24, and at least partially controlling the rendering of such content at the source and/or destination (i.e., participants of a conference session). As shown, when the source application 76 is rendering content for display or processing content, or has otherwise selected content, at the source 72, the source client 78 can be initiated to initiate transfer of the content to a destination 74, as shown in block 88. For example, when the source application is processing content at the source, a printing finction of the source application can be initiated, such as by a user of the source, with the source client selected as the printer device. Alternatively, in some applications the installation of a printer driver, such as the source client, can cause macro command buttons to be embedded into the application's menu bar, which can directly activate the printing process to the designated printer driver. For example, the printer driver installation can create a command button named "Mobile Recipient" into Microsoft® Office applications (e.g., Word, PowerPoint®, etc.) in the "File/Send To" menu, which can thereafter be used to initiate the source client.

After initiating the source client 78, the source client can reformat the content into a vectorized format, such as the SVG format, or an intermediate format, such as the PostScript format, as shown in block 90. For example, when the source operates in accordance with the Windows® operating system, the source client can interface with the Windows® Graphics Device Interface (GDI), producing a vectorized graphics description file from the printer output of the content from the source application 76. Alternatively, for example, the source client can produce a graphics description file in an intermediate format, which can thereafter be formatted by the conferencing server 25 into a vectorized format supported by the destination, as explained below.

Irrespective of the format of the content produced by the source client 78, as shown in block 92, the source client can request, and thereafter receive from a source user, an address (e.g. MSISDN, SIP address, etc.) of the destination 74 of the reformatted content, as well as any of a number of other pieces of information, if so desired. For example, as shown in FIG. 6, the source client can present, on a display of the source, a dialog box requesting the MSISDN of a destination comprising a terminal 10. In addition, the dialog box can receive a text message that can be transferred to the destination along with the reformatted content. As will be appreciated, the destination address can be received in any of a number of different manners. For example, the destination address can be received manually, such as from a source user via a user input interface of the source. Alternatively, the destination address can be selected from a directory (e.g., contacts directory) based upon a user of the destination, for example, where the directory is stored or otherwise accessible by the source.

If so desired, the source client 78 can also request, and receive, one or more configuration parameters to thereby permit a source user to configure the source client. For example, as shown in FIG. 7, the source client can request, and receive, configuration parameters including an identity or other information relating to the source user, such as the name, phone number and/or e-mail address of the user (one or more identities of the source being referred to as "source user information"). Also, for example, configuration parameters can include an address, and any other locators, parameters and the like of a conferencing server 25 (e.g., IP address, port number, communication protocol, servlet path, user ID/password to access the conferencing server, etc.). In addition, if the source communicates with the conferencing server via a proxy server, such as in instances where firewall restrictions require the user of a proxy server (not shown), the configuration parameters can include an address, and any other locators, parameters and the like of the proxy server (e.g., IP address, port number, user ID/password to access the proxy server, etc.). As will be appreciated, although the source client can receive configuration parameters each time the source client is initiated to transfer content, the source client more typically receives configuration parameters before the first instance of transferring content, and thereafter uses the same configuration parameters (unless altered by the source user) to transfer subsequent pieces of content.

Irrespective of how the source client 78 receives the destination address, and irrespective of how the source client is configured, after reformatting the content and receiving the destination address, the source client can thereafter transfer the reformatted content and destination address (and other information—e.g., source user information, text message, etc.—if included) to the conferencing server 25 (identified in the configuration parameters), as shown in block 94. Before transferring the content and destination address to the conferencing server, however, the source client can, if so desired, compress the reformatted content, such as in accordance with the GNU zip technique. Also, when the source client reformats the content into the SVG format, the source client can, if so desired, create an additional (SVG) document including the text message received by the source client (if so received) and source user identity, which can be appended to the SVG formatted content.

To transfer the reformatted content to the conferencing server 25, the source 72 can establish a communication session with the conferencing server. For example, the source can establish a communication session with the conferencing server in accordance with the communication protocol specified in the configuration parameters. For example, the source can establish a communication session with the conferencing server at least partially over an Internet Protocol (IP) network (e.g., the Internet 22) in accordance with HTTP or HTTPS (HTTP over Secure Sockets Layer). Thereafter, the source can be authenticated to the conferencing server, such as for billing and/or account verification purposes. For example, the source can be authenticated to the conferencing server in accordance with a user ID/password technique using the user ID/password previously specified in the configuration parameters.

Presuming the source 72 is successfully authenticated to the conferencing server 25, the source client 78 can transfer the reformatted content and destination address, as well as any source user information and additional text message, to the conferencing server, or more particularly the messaging gateway 80 of the conferencing server. Then, upon receipt of the reformatted content, destination address and other information by the messaging gateway, the communication session between the source and conferencing server can be closed. Before closing the communication session, however, the source client can request a delivery receipt from the messaging gateway such that, after the destination 74, or more particularly the destination client 84, receives the content from the messaging gateway (explained below), the messaging gateway sends a notification message to the source client (e.g., via e-mail, SMS message, etc.) to notify the source of the destination's receipt of the content.

After receiving the reformatted content, the messaging gateway 80 of the conferencing server 25 can post-process the reformatted content, as shown in block 96. For example, the messaging gateway can uncompress the reformatted content (if previously compressed). Thereafter, in instances in which the reformatted content is in an intermediate format (e.g., PostScript), the messaging gateway can reformat the content from the intermediate format into the vectorized format (e.g., SVG). Irrespective of whether the messaging gateway reformats the content from the intermediate format to the vectorized format, the messaging gateway can also process the content to compress any raster images (e.g., JPG, PNG, BMP, etc.) embedded in the content, to reduce the size of such images, and thus the size of the content. Before compressing such images, however, the messaging gateway can, if so desired, convert the embedded images of various formats to a common format (e.g., JPG) that is supported by the vectorized format. In this regard, in one embodiment, the messaging gateway can set the resolution and compression level of the raster images embedded in the content, as well as set initial SVG "view box" parameters, based upon display and/or memory capabilities of the destination. In this regard, the conferencing server can maintain a database of such capabilities for a plurality of destinations, such as for those destinations that have registered with the conferencing server.

After post-processing the reformatted content, the messaging gateway 80 of the conferencing server 25 can prepare a header page including, for example, the text message received by the source client 78 (if so received), the source user's identity, as well as the date and/or time of document creation and other transaction information that may be desirable to the destination 74, or more particularly the destination user. The messaging gateway can then embed the header page in the reformatted content. It should be noted that in various instances the vectorized format may not support embedding the header page in the reformatted content or not otherwise support content including multiple pages. For example, the SVG-Tiny format currently does not support pagination with the "Page/PageSet" keywords. Thus, in an alternative embodiment, content pagination can be handled by the destination, or more particularly the destination client 84. In such instances, in lieu of embedding the header page in the reformatted content, the header page can be handled as a separate piece of content from the reformatted content from the source, where each piece of content can identify the order of the respective piece with respect to other pieces of content. Also in such instances, content including multiple printed pages can be divided into multiple reformatted pieces of content, with each piece of reformatted content typically including a single printed page.

After preparing the header page and including the header page with the reformatted content, the messaging gateway 80 of the conferencing server 25 can compress the content (or pieces of content) into a single compressed file, which can thereafter be at least temporarily stored in the transaction database (e.g., in memory 39) along with a unique session authentication key, if so desired. Then, the compressed file can be transferred to the destination 74. The messaging gateway can directly push the header page/reformatted content to the destination. As explained below, in a more typical embodiment, however, the messaging gateway signals the destination, or more particularly the destination client 84 to thereby notify the destination client of the availability of reformatted content intended for the destination, such as via a cellular communication channel (e.g., SMS channel) for signaling the destination client. Thereafter, the destination can establish a communication session with the conferencing server to thereby permit the destination client to download the reformatted content from the messaging gateway.

More particularly, after including the header page with the reformatted content, the messaging gateway 80 of the conferencing server 25 can determine if the destination has previously registered with the conferencing server, and includes a destination client, such as by cross matching the address of the destination against the terminal database (e.g., in memory 39) of registered destinations. If the destination has not previously registered with the conferencing server, the messaging gateway can instruct the destination 74, or more particularly the destination user, as to how (and from where) to download and install a destination client 84 to enable the destination to thereafter download content intended for the destination. The messaging gateway can instruct the destination in any of a number of different manners, but in one embodiment, the messaging gateway instructs the destination by sending a SMS message through a respective SMSC 18 (see FIG. 1) to the destination, where the SMS message includes appropriate instructions. Thereafter, the destination can download and install a destination client in accordance with the instructions, and register with the conferencing server. In this regard, in registering with the conferencing server, the destination client can provide the conferencing server with an identity of the destination and an address of the destination. For example, when the destination comprises a terminal 10, the destination client can provide the conferencing server with the IMEI code and MSISDN of the terminal. The conferencing server can, upon receipt, store the identity and associated address of the destination in the terminal database to thereby ensure that only the proper terminal (identified by the IMEI code) can access content intended for receipt by the terminal from the source, which can indicate the address (e.g., MSISDN) of the terminal.

If the destination 74 has previously registered with the conferencing server 25, or as or after the destination registers with the conferencing server, the messaging gateway 80 of the conferencing server can signal the destination, or more particularly the destination client 84, to thereby notify the destination client of the availability of content intended for the destination. Although the messaging gateway can signal the destination client in any of a number of different manners, in one embodiment, the messaging gateway signals the destination client by sending an appropriate notification message to the destination client. Whereas the messaging gateway can send a notification message directly to the destination client, in one typical embodiment, the messaging gateway communicates signaling information to a messaging center (e.g., SMSC 18) or other proxy, which is capable of thereafter sending a notification message (e.g., SMS message) to the destination, the notification message including signaling information from the messaging gateway, as shown in block 98. In this regard, the message can include a header portion, which the destination client or other application (e.g., operating system) operating on the destination can identify and process accordingly. For example, for a destination comprising a terminal 10 operating a Symbian brand operating system, the destination client can register with the operating system and request to receive messages, such as SMS messages, having a specific header type. Then, when such a destination receives a notification message, the operating system can identify the header portion of the message, and thereafter launch the destination client to receive the message.

In addition to the header portion, the notification message can identify the reformatted content, and possibly the size of the reformatted content and any other information relevant to the destination 74, destination client 84 or destination user in determining whether to download the reformatted content from the messaging gateway 80 of the conferencing server 25.

The notification message can also include the address of the conferencing server, source user information (e.g., name and/or e-mail address). In addition, if so desired, the notification message can include a session authentication key (stored in the transaction database along with the reformatted content and destination address) such that the destination can thereafter be authenticated based upon the session authentication key, as explained below. For example, as shown in FIG. 8, the destination can receive a notification message that the destination client is capable of interpreting and displaying as the following destination user notification: "You have received new printouts from: source@domain.com: File name: Meeting slides: File size: 136 kB." As will be appreciated, the destination user notification can be included within the notification message. Alternatively, the notification message can be configured to include the appropriate signaling information, with the destination client or other messaging application (e.g., application program interface—API) in communication with the destination client, forming an appropriate destination user notification for display to the destination user.

At any point after receiving the notification message from the messaging gateway 80 of the conferencing server 25, the destination 74 can establish a communication session with the conferencing server to thereby permit the destination client 84 to download the reformatted content from the messaging gateway, as shown in block 100. The communication session can be established in accordance with any of a number of different transfer techniques, including any of a number of different cellular (e.g., 1G, 2G, 2.5G, 3G, etc.) communication techniques such as IS-136 (TDMA), GSM, IS-95 (CDMA), GPRS, EDGE, MBMS, DVB (e.g., DVB-T, DVB-H, etc.), CSD (Circuit Switched Data), HSCSD (High-Speed CSD), any of a number of different short range communication techniques such as RF, BT, IrDA, and/or any of a number of different wireless and/or wireline networking techniques such as LAN and/or WLAN techniques. If so desired, in downloading the reformatted content, the destination client 84 can further establish a secure communication session, such as a SSL (secure sockets layer) IP session, with the conferencing server.

After the destination 74 establishes a communication session with the conferencing server 25, the destination client 84 can identify the destination to the conferencing server and, if so desired, authenticate the destination to the conferencing server. For example, when the destination comprises a terminal 10, the destination client can identify, and thereafter authenticate, the destination using the IMEI code of the terminal. More particularly, after the destination client establishes the communication session with the conferencing server, the conferencing server can request the IMEI code of the terminal, which the conferencing server can match with the codes of registered destinations stored in the terminal database (e.g., in memory 39). After the conferencing server matches the IMEI code with a code stored in the terminal database, the messaging gateway 80 of the conferencing server can fetch the destination address stored in the terminal database associated with the IMEI code also stored in the terminal database. The messaging gateway can search the transaction database to locate a session authentication key and reformatted content stored in the transaction database and associated with the fetched destination address. The messaging gateway can then query the destination client for the session authentication key sent to the terminal during signaling of the terminal. If the session authentication key thereafter received from the terminal matches the session authentication key located from the transaction database, the destination is authenticated. Otherwise, the destination is not authorized.

Irrespective of how the destination 74 is authenticated to the conferencing server 25 and/or the messaging gateway 80 of the conferencing server, if the destination is successfully authenticated to the conferencing server, the messaging gateway can then retrieve the reformatted content from the transaction database based upon the address of the destination, particularly when the messaging gateway supports transferring content between a plurality of sources 72 and destinations. The destination client 84 can download the reformatted content intended for the destination and, if so desired, store the reformatted content in memory of the destination. Upon receipt of the reformatted content by the destination client, the messaging gateway can, if so desired, delete or otherwise remove the content from the transaction database. In addition, the messaging gateway can, but need not, notify the source, or more particularly the source client 78, of the completed delivery of the content, such as by sending a notification e-mail or SMS message to the source. In addition, as will be appreciated, the messaging gateway can maintain a log of content transfers, which can thereafter be used to create billing information for the source and/or destination based on the content transfer.

After downloading the reformatted content, the content can be utilized in any of a number of different manners. In this regard, the destination client 84 and/or the destination application 86 in communication with the destination client can uncompress the content (if compressed), and render the content for display by the destination. For example, when the content is reformatted in the SVG format, and the format permits pagination within SVG content using, for example, Page/PageSet keywords, all of the piece(s) of content can be rendered for display. If the format does not permit pagination, however, each piece of content can be rendered in accordance with the ordering identified by each piece of content with respect to other pieces of content. In such instances, each piece of content is temporarily stored for rendering, with the compressed file including all of the pieces of content maintained in memory of the destination.

In addition to, or in lieu of, rendering the reformatted content, the destination client 84 and/or the destination application 86 can be capable of transferring the content to one or more other devices. For example, the destination client and/or application can be capable of transferring the content to one or more electronic devices 35, such as printers, digital projectors and/or other multimedia capturing, producing and/or storing devices (e.g., other terminals). Like with downloading the content to the destination 74, the destination client and/or application can transfer the content in accordance with any of a number of different transfer techniques, including any of a number of different cellular communication techniques, short range communication techniques, and/or any of a number of different wireless and/or wireline networking techniques. Irrespective of how the destination client and/or application transfers the content, the destination client and/or application can transfer the reformatted content to devices capable of interpreting the format of the content. Alternatively, the destination client and/or application can be capable of again formatting the content in any of a number of different formats capable of being interpreted by the device receiving the content.

In accordance with a further aspect of the present invention, the source 72 and destination 74 desire to engage in a conference in which content, such as that sent by the source and received by the destination, is simultaneously rendered by both the source application 76 and the destination application 86, such as to augment a verbal communication between the source user and destination user. Thus, before and/or after the destination client 84 downloads the reformatted content, a conference session can be established between the source and the destination via the conferencing gateway 82 of the conferencing server 25, as shown in block 102. As explained below, one typical embodiment includes the conference session being established after the destination client downloads reformatted content from the messaging gateway 80. It should be understood, however, that additionally or alternatively content may be sent from the source to the destination after the conference session is established, such as during the conference session. In such instances, the content may be sent during the conference session in any of a number of different manners, such as in the same manner explained above. Thus, for example, one page of multi-page content may be sent from the source to the destination via the messaging gateway before the conference session is established. Then, during the conference session, other pages of the multi-page content may be similarly sent to the destination, such as when the source (functioning as the conference host) turns the pages of the multi-page content or otherwise renders the other pages.

As will be appreciated, the conference session can be established in any of a number of different manners. For example, as the source client 78 requests, and receives, configuration parameters, the source client can receive a configuration parameter requesting to enter the source in a conference session with the destination (previously identified to the source client). Then, in addition to signaling the destination client 84 to notify the destination client of the availability of content intended for the destination, the messaging gateway 80 can also signal the conferencing gateway 82 and the destination client to notify the conferencing gateway and destination client of the source client's request to enter into a conference session. If the destination client, or more particularly the destination user, also desires to enter into a conference session with the source, the destination client can notify the conferencing gateway of its acceptance of the source client's request, after the communication session is established between the destination and the conferencing server.

Then, after the source client 78 transfers the content to the messaging gateway 80 of the conferencing server 25, the source or the conferencing gateway 82 of the conferencing server can maintain the communication session between the source and the conferencing server. Alternatively, the source or conferencing gateway can alternatively establish a new communication session between the source client and the conferencing server, such as in the same manner as before. Likewise, after the destination client 84 downloads the content, the destination or the conferencing gateway can maintain the communication session between the conferencing server and the destination. Alternatively, the destination or conferencing server can establish a new communication session between the conferencing server and the destination client, such as in the same manner as before. Irrespective of how the communication sessions between the source and conferencing server, and the destination and the conferencing server, are established, however, the conferencing gateway can thereafter establish the conference session between the source 72 and the destination 74 across the communication sessions between the source client and the conferencing server, and the destination client and the conferencing server.

Before or after the conference session is established between the source 72 and the destination 74 via the conferencing gateway 82 of the conferencing server 25, a host for the conference session can be selected from among the conference participants, the other conference participant being referred to as a conference member, as shown in block 104. The host can be selected in any of a number of different manners. For example, the source can be selected as the host by default when messaging gateway 80 notifies the conferencing gateway of the source client's request to enter into a conference session with the destination. Alternatively, for example, the source or destination can be selected as the conference host after the conference session is established by one of the conference participants sending the conferencing gateway a request to operate as the conference host.

Regardless of how the conference host is selected, the host client (e.g., source client 78) can send, and the conferencing gateway 82 of the conferencing server 25 can receive, one or more control events, as shown in block 106. The control events can comprise any of a number of different instructions that at least partially control the rendering of the content by the conference member. For example, the control events can include instructions directing the conference member to uncompress the content (if compressed), and render the content for display by the conference member, such as in the manner explained above. Additionally or alternatively, control events can include instructions directing the conference member to scroll within a page of content already being rendered, move a cursor or other pointer relative to rendered content, change the page of rendered content including multiple pages, toggle between different view modes of rendered content, or the like.

Also, the control events sent by the host client (e.g., source client 78), and received by the conferencing gateway 82, can be selected in any of a number of different manners. For example, after the conference session is established between the host and the conference member, a control event may instruct the conference member, or more particularly a conference member client (e.g., destination client 84) and/or conference member application (e.g., destination application 86) in communication with the conference member client, to render the content for display (if the content is not already being rendered for display). Also during the conference session, a host application (e.g., source application 76) can render the content for display, the content being rendered by the host and the conference member at least partially in a synchronous manner.

As shown in FIG. 9A, for example, consider a source 72 comprising a computing system 24 that is operating a source application 76, where the source is functioning as the host of a conference session with at least one conference member comprising destination 74 comprising a mobile terminal 10 operating a destination application 86. Also, consider that the content transferred from the source to the destination comprises a multi-page presentation. Further consider that the source application is capable of rendering one or more pages of the multi-page content, and is capable of communicating with the host, source client 78 to present a toolbar 116 for directing various aspects of the rendering of the content by the source application, and during a conference session with the destination, also by the destination application. The toolbar, shown more particularly in FIG. 9B, can include one or more selectable elements 118 that direct navigation between the pages of the multi-page content. For example, the toolbar can include a selectable element 118a for directing the source application to render a page sorter view 120 of the content that includes a thumbnail rendering of a number of pages of the content such that a source user can direct the source application to render a specific page of the content. Also, for example, the toolbar can include selectable elements 118b for navigating to the first page of the content, the page before the currently rendered page, the page after the currently rendered page, and/or the last page of the content.

Over the course of the conference session, the host application (e.g., source application 76) can be directed, such as by a host user (e.g., source user), to modify or otherwise alter the rendering of the content at the host (e.g., source 72), or more particularly by the host application. Again referring to FIGS. 9A and 9B, for example, the source application rendering the content and presenting the toolbar 116 can receive a selection of one or more of the selectable elements 118 on the toolbar to navigate between pages of the multi-page content. Additionally or alternatively, for example, the source application can be directed to modify or otherwise alter the rendering of the content based upon input received by the source application from a source user via a user input interface of the source, such as by directing a cursor or other pointer relative to the rendered content to zoom, pan and/or scroll within a page of the rendered content. Irrespective of how the host application is directed to modify or otherwise alter the rendering of the content at the host, however, the source client can generate or otherwise select control events to represent the modifications made to the rendering of the content by the host application. And as explained below, the control events can be subsequently used to direct the conference member application to make the same modifications made by the host application such that the content rendered by the participants of the conference session may remain at least partially synchronized.

Thus, after a control event is received at the conferencing gateway 82 of the conferencing server 25 from the conference host client (e.g., source client 78), the conferencing gateway can transfer the control event to the conference member, or more particularly a conference member client (e.g., destination client 84), as shown in block 108. Upon receipt of the control event, the conference member client, and/or a conference member application (e.g., destination application 86) in communication with the destination client, can render the content in accordance with the control event, as shown in block 110. For example, when the control event includes instructions to uncompress the content (if compressed), and render the content for display, the conference member client and/or conference member application can process the control event to accordingly uncompress the content (if compressed), and render the content for display. Alternatively, for example, when the control event includes instructions to scroll within a page of content already being rendered, move a cursor or other pointer relative to rendered content, or change the page of rendered content including multiple pages, the conference member client and/or conference member application can process the control event to accordingly effectuate the respective instructions.

More particularly, when the control event includes instructions to toggle to a whole page view of rendered content, the conference member client (e.g., destination client 84) and/or conference member application (e.g., destination application 86) can accordingly process the control event to thereby allow an entire page to be rendered, as shown in FIG. 10A. Returning to FIG. 9, for example, the host, source application 76 can be directed to render a whole page view of rendered content, such as by selecting a page directly from a page sorter view 120 of the content, where the source application is directed to render the page sorter view by means of selectable element 118a. Alternatively, the source application can be directed to render the whole page view by navigating through the pages of the multi-page content by means of one or more of selectable elements 118b. In either event, upon being directed to render the whole page view, the host, source client 78 can generate or otherwise select control events, and transfer those control events, such that the conference member, destination application 86 is capable of similarly rendering the entire page of content.

When the control event includes instructions to move a cursor or other pointer, for example, the conference member client (e.g., destination client 84) and/or conference member application (e.g., destination application 86) can accordingly process the control event to move the pointer relative to the rendered content. Continuing the example shown in FIG. 9, the host, source user can direct movement of a cursor or other pointer 122a relative to the content rendered by the host, source application 76, such as by means of a user input interface of the source, as shown in FIG. 11. In response to movement of the pointer, the host, source client 78 can generate or otherwise select control events, and transfer those control events, such that a pointer 122b is similarly capable of being moved relative to content rendered by the conference member, destination application 86.

When the control event includes instructions to toggle to a zoom and/or pan view of rendered content, for example, the conference member client (e.g., destination client 84) and/or conference member application (e.g., destination application 86) can accordingly process the control event to zoom the rendered content by a specified factor, and/or pan within the rendered content, as also shown in FIG. 10B. Again referring to the example shown in FIG. 9, the host, source user can again direct movement of a cursor or other pointer 122a relative to the content rendered by the host, source application 76, such as by means of a user input interface of the source, as shown in FIG. 12. The source user can then select a portion 124 of the rendered content, such as the portion about the pointer (selection of the portion being illustrated as a series of concentric circles), by means of the user input interface. Then, in response to the source user's selection of the portion of the rendered content, the host, source client 78 can generate or otherwise select control events for panning to that portion of the content selected by the source user. Thus, upon receipt of the respective control events, the conference member, destination application 86 is capable of accordingly panning to the portion of the similarly rendered content selected by the source user. In such an instance, a pointer 122b can be presented relative to panned portion rendered by the destination application, such as in accordance with other control events processed by the destination application, as also shown in FIG. 12.

Further, when the control event includes instructions to toggle to a text wrap view of rendered content, the conference member client and/or conference member application can process the control event to accordingly render the content where only the text content of the document is rendered for display, and wrapped to a display screen width, as shown in FIG. 10C.

During the conference session between the host (e.g., source 72) and conference member (e.g., destination 74), the host client (e.g., source client 78) can send, and the conferencing gateway 82 of the conferencing server 25 can receive, additional control events, as shown in block 112. For each received control event, the conferencing gateway can, as before, transfer the control event to the conference member or, more particularly, a conference member client (e.g., destination client 84) (see block 108). In turn, the conference member client, and/or a conference member application (e.g., destination application 86) in communication with the destination client, can render the content in accordance with the control event, as before (see block 110).

The conference session between the host (e.g., source 72) and conference member (e.g., destination 74) can continue for a period of time after the last control event sent by the host client (e.g., source client 78) is received by the conferencing gateway 82 of the conferencing server 25. At some point after the last control event is processed by the conference member client (e.g., destination client 84) and/or conference member application (e.g., destination application 86) to render the content in accordance with the respective control event, the host and/or conference member may desire to end the conference session. At such an instance, then, the host and/or conference member can close the conference session, as shown in block 114. Closing the conference session, then, may close the communication sessions previously established between the host and the conferencing server, and the conferencing server and the destination.

As more particularly explained above, the conference session includes a conference host (e.g., source 72) and a single conference member (e.g., destination 74). It should be understood, however, that the conference session may, and often will, include a number of additional conference participants, typically additional destinations. In such instances, then, the conference session includes a host and a plurality of conference members. In one typical embodiment, for example, the host comprises a source 72 such as a computing system 24 in a fixed network environment. The conference members in the typical embodiment, then, comprise destinations 74, at least one of which is a terminal 10 in a cellular network environment. Also, one or more of the destinations may comprise other computing systems, also in the fixed network environment.

As will be appreciated, the host of the conference session may be selected at one or more times before and/or during the conference session. Thus, whereas the source 72 may initially be selected as the conference session host, at some point during the conference session, the host may be reselected to be a destination 74. At such an instance, then, a destination becomes the host and the source becomes the conference member, with control events being sent and received in the same manner between the host and the conference member, as explained above. Also during the conference session, the host can again be reselected to be another destination, or even to again be the source.

As also explained above, the conference host directs the rendering of the content at the conference members during the conference session. It should also be appreciated, however, that the conference members themselves may also at least partially control the local rendering of the content. Thus, the conference member client (e.g., destination client 84) and/or conference member application (e.g., destination application 86) can render, or be directed to render (e.g., by a conference member user), the content independent of a control event directing the rendering of the content. Likewise, the conference member client (e.g., destination client 84) and/or conference member application (e.g., destination application 86) can modify or otherwise alter the rendering of the content, or be directed to do the same, independent of a control event.

Again returning to the example of FIG. 9 for a moment, presume that the host, source application 76 is rendering a whole page view of rendered content, and that the host, source user is directing or has directed movement of a pointer 122a relative to the rendered content, as shown in FIG. 13. In such an instance, the conference member, destination application 86 is capable of similarly rendering the entire page of content, and a pointer 122b is similarly capable of being moved relative to content rendered by the conference member, destination application 86. Also in such an instance, the destination user can select a portion of the content rendered by the destination application, such as by means of the user input interface of the destination 74. By selecting a portion of the content, the destination user can direct the destination application to zoom and/or pan within the content rendered by the destination application, the destination application being directed independent of control events from the host, source application.

Additionally, as explained above, the messaging gateway 80 of the conferencing server 25 is capable of signaling the destination 74 to thereby notify the destination of the availability of content intended for the destination. In response to the being signalled, then, the destination client 82 can be capable of downloading the content. It should be understood, however, that the messaging gateway can be capable of sending, or the destination client can be capable of retrieving, the content without requiring the destination user to respond to a notification message prompting the destination user to download the content. In such instances, the destination client can be configured to operate in the background to initiate communication with the messaging gateway to automatically download the content upon being signalled by the messaging gateway, without requesting permission, or otherwise receiving input, from the destination user. As will be appreciated, such a delivery of content may resemble MMS (Multimedia Messaging Service) delivery, where the destination client downloads the content in the background and alerts the destination user after the content is successfully downloaded to the destination.

As described herein, content is reformatted by a source 72 and transferred to a messaging gateway 80 of a conferencing server 25, which in turn, transfers the content to the destination 74. It should also be understood, however, that the content may alternatively be transferred directly between the source client 78 and destination client 84, without the messaging gateway otherwise handling post-processing and delivery of the content to the destination. For example, the content may be transferred between the source and destination in accordance with the Session Initiation Protocol (SIP). Alternatively, the source client can transfer the content to a messaging gateway, with the messaging gateway sending the notification message, and the destination client downloading the content, in accordance with SIP. In such instances, as will be appreciated, the destination address can comprise a SIP address of the destination.

Further, as explained above, the source 72 and destination 74 can engage in a conference in which content, such as that sent by the source and received by the destination, is simultaneously rendered by both the source application 76 and the destination application 86. And as the destination downloads reformatted content from the messaging gateway 80, the content having been reformatted from that stored by the source, it will be appreciated that the content rendered by the source typically comprises that stored by the source, while the content rendered by the destination typically comprises the reformatted content downloaded by the destination. It should be understood, however, that as the source, or more particularly the source client 78, is capable of reformatting the content, the content rendered by the source can alternatively render the reformatted content, as does the destination, if so desired. Thus, the source can more particularly control the rendering of the reformatted content at the destination.

To illustrate the benefits of embodiments of the present invention, consider the case of a "mobile meeting." In such an instance, consider that a destination 74 comprises a mobile terminal 10 of a mobile user that is away from the user's office and needs to attend a business meeting occurring at the office. In order fully participate in the business meeting, the mobile user needs to be able to share the same meeting material (i.e., content) as the other meeting attendees, who are present at the meeting. Thus, the mobile user asks the meeting organizer at the office to send a digital printout of the material to his mobile terminal. The meeting organizer, operating a personal computer (i.e., source 72) at the office, prints the content using the source client to format the meeting material into a vectorized format (e.g., SVG), which is thereafter sent by the source client to the mobile user's mobile terminal via a messaging gateway 80 of a conferencing server 25.

In accordance with one embodiment of the present invention, the meeting organizer can reformat and send the meeting material by printing from the application as usual, but instead of directing the meeting material to a paper printer, the meeting organizer selects the source client 78, which comprises a printer driver. By printing the meeting material to the source client printer driver, the meeting organizer can cause a digital printout of the meeting material to be delivered to the mobile user's mobile terminal 10 in a vectorized format. Thus, after downloading the meeting material, the meeting organizer can, via a messaging gateway 80 of the conferencing server 25, remotely cause the mobile terminal to render the meeting material for display by the mobile terminal, zoom in, pan, scroll and/or view the meeting material in detail, and in a manner simultaneously with the other meeting participants while participating in a conference call with the other meeting participants.

To further illustrate the benefits of the present invention, consider the case of a "rich call," where shared content can be used to augment a cellular voice call. In this instance, a personal computer (PC) (i.e., source 72) user desires to discuss some subject with a mobile user over the phone, and desires to share some content as a common reference with the mobile user during the phone call. The PC user can operate the PC to print the content using the printer driver source client 78, which allows the PC user to add the addressing information (e.g., mobile phone number) and enter an additional text message to the mobile user. Before transferring the content to the mobile terminal 10 (i.e., destination 74) of the mobile user, the messaging gateway 80 of a conferencing server 25 can send a notification message to the mobile user showing the source, size and name of the content available, and prompting the mobile user to download or cancel the operation. After the mobile user has successfully downloaded the content, the messaging gateway can notify the source that the content has been delivered. Upon receipt of the content delivery notification, the source can call the mobile user such that the parties can participate in a phone call while being able to share and reference the common material during the call, with the source at least partially directing the rendering of the content by the mobile terminal via the conferencing gateway 82 of the conferencing server.

As will be appreciated, in addition to permitting content sharing between source and destination users, embodiments of the present invention can be capable of enhancing "machine-to-man" communication and services. For example, the source client 78 and messaging gateway 80 of the conferencing server 25 can be utilized in mobile e-mail services to enable mobile users to access e-mail attachments (i.e., content) by having the attachments "printed" to their terminal (i.e., destination). Also, for example, back-office applications, such as those provided by SAP, Oracle and the like, can be capable of utilizing the source client to "print" documents to mobile terminals (e.g., destinations) when requested by the mobile user.

According to one aspect of the present invention, all or a portion of the system of the present invention, such all or portions of the conferencing server 25, source 72 and/or destination 74, generally operates under control of a computer program product (e.g., source application 76, source client 78, messaging gateway 80, conferencing gateway 82, the destination client 84, destination application 86, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 5a and 5b are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts' block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts' block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts' block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
    a plurality of conference participants, the participants including a source and at least one destination that are each configured to store content, wherein the source is configured to operate in a fixed network environment, and at least one of the destinations comprises a mobile terminal configured to operate in a wireless network environment; and
    a conferencing server configured to interface between the fixed network environment and the wireless network environment,
    wherein the source is configured to transfer the content stored by the source, the content being transferred to the destinations via the conferencing server, the source including printer driver program code configured to reformat the content into an intermediate format before the respective reformatted content is transferred to the destinations and the conferencing server being configured to reformat the content from the intermediate format into a vectorized format,
    wherein the conferencing server is configured to establish a conference session between the plurality of participants, wherein one of the participants is a host of the conference session and the other participants are members of the conference session, wherein the conferencing server is configured to receive at least one control event from the host, and thereafter transfer the control events to the members to cause the members to render the content stored by the respective members in response to and in accordance with the control events, the control events directing the rendering of respective content, and provide for zooming or panning within the rendered content at the members, independent of the control events;
    wherein the participants, the source, the at least one destination, the conferencing server, the host, and the members each comprise circuitry.

2. A system according to claim 1, wherein the conferencing server is configured to receive the control events from the source at least partially across a fixed network, and configured to transfer the control events to the mobile terminal at least partially across a wireless network, when the source is the host and the mobile terminal is a member.

3. A system according to claim 2, wherein the conferencing server is configured to receive the control events from the mobile terminal at least partially across the wireless network, and configured to transfer the control events to the source at least partially across the fixed network, when the mobile terminal is the host and the source is a member.

4. A system according to claim 1, wherein the conferencing server is configured to receive a control event to render the content for display, and wherein the conferencing server is configured to transfer the control events to enable the members to process at least one control event to render the content for display by the respective members.

5. A system according to claim 4, wherein the host is configured to present a user interface such that a user is capable of directing the host, by means of the user interface, to render the content for display,
    wherein the host is directable to render the content to enable the host to render the content for display by the host, and to enable the conferencing server to transfer the control events to permit the members to similarly render the content for display by the respective members at least partially in synch with the host.

6. A system according to claim 1, wherein the conferencing server is configured to receive a control event to alter the rendering of the content for display, and wherein the conferencing server is configured to transfer the control events to enable the members to process at least one control event to alter the rendering of the content for display by the respective members.

7. A system according to claim 6, wherein the host and members are configured to render the same content for display, wherein the host is configured to present a user interface such that a user is capable of directing the host, by means of the user interface, to alter the rendering of the content for display, wherein the host is directable to alter the rendering to enable the host to alter the rendering by the host, and to enable the conferencing server to transfer the control events to permit the members to similarly alter the rendering by the respective members at least partially in synch with the host.

8. A system according to claim 1, wherein the conferencing server is configured to receive the content transferred by the source, store the content, and thereafter transfer the content to the destinations to enable the destinations to store the content at least one of before or after the conferencing server establishes the conference session.

9. A system according to claim 8, wherein the source is configured to transfer the content and addresses of the destinations, wherein the conferencing server is configured to receive and store the content and the addresses of the destinations, wherein the conferencing server is also configured to signal the destinations based upon the destination addresses, the signaling including information required to access the content, and wherein the conferencing server is configured to transfer the content in response to receiving requests from the destinations, the requests being in response to the conferencing server signaling the destinations.

10. A system according to claim 9, wherein the source is configured to receive the addresses of the destinations including an address of the mobile terminal, the mobile terminal address comprising one of a mobile telephone number or a Session Initiation Protocol (SIP) address.

11. A system according to claim 9, wherein the conferencing server is configured to signal the mobile terminal at least partially across a wireless network.

12. A system according to claim 11, wherein the conferencing server is configured to signal the mobile terminal in accordance with the Short Messaging Service (SMS).

13. A system according to claim 11, wherein the conferencing server is configured to signal the mobile terminal in accordance with the Session Initiation Protocol (SIP).

14. An apparatus comprising at least one processor and at least one memory including computer program code, the at least one memory and the computer program code configured to, with the at least one processor, cause the apparatus at least to perform:
operating a source client in a conference session between a plurality of participants via a conferencing server configured to reformat content from an intermediate format into a vectorized format, the participants including the apparatus and at least one destination that is configured to store content, wherein at least one of the destinations comprises a mobile terminal configured to operate in a wireless network environment, wherein one of the participants is a host of the conference session and the other participants are members of the conference session,
wherein the source client is configured to cause transfer of the content stored in a memory, and also configured to cause storing of content, the content being transferred to the destinations via the conferencing server, the source client including printer driver program code configured to reformat the content into an intermediate format before the respective reformatted content is transferred to the destinations,
wherein the source client is configured to cause sending of at least one control event to the conferencing server when the apparatus is the host, the control events being sent to enable the conferencing server to thereafter transfer the control events to the members, and to cause the members to thereafter render the content stored by the respective members in response to and in accordance with the control events, the control events directing the rendering of respective content, and provide for zooming or panning within the rendered content at the members, independent of the control events,
wherein the source client is configured to receive control events from the conferencing server when the apparatus is a member, the conferencing server having received the control events from the host, the source client receiving the control events to enable at least one of the source client or another application operated by the processor to render the content in response to and in accordance with the control events; and
wherein the source client, the at least one destination, the conferencing server each comprise circuitry.

15. An apparatus according to claim 14, wherein the source client is configured to cause sending of the control events to the conferencing server at least partially across a fixed network to enable the conferencing server to transfer the control events to the mobile terminal at least partially across a wireless network when the apparatus is the host and the mobile terminal is a member.

16. An apparatus according to claim 15, wherein the source client is configured to receive the control events from conferencing server at least partially across the fixed network, the conferencing server having received the control events from the mobile terminal at least partially across the wireless network, when the mobile terminal is the host and the apparatus is a member.

17. An apparatus according to claim 14, wherein at least one control event comprises a control event for rendering the content for display,
wherein the source client is configured to cause sending of the control events when the apparatus is the host, the control events being sent to enable the members to thereafter process at least one control event to render the content for display by the respective members, and
wherein the source client is configured to receive control events from the conferencing server when the apparatus is a member, the source client receiving the control events to enable at least one of the source client or another application operated by the processor to process at least one control event to render the content for display by the apparatus.

18. An apparatus according to claim 17, wherein the source client is configured to cause presentation of a user interface when the apparatus is the host such that a user is capable of directing at least one of the source client or another application operated by the processor, by means of the user interface, to render the content for display, wherein the at least one of the source client or the other application is directable to render the content to enable the content to be rendered for display by the host, and to enable the source client to cause sending of the control events to permit the members to similarly render the content for display by the respective members at least partially in synch with the apparatus.

19. An apparatus according to claim 14, wherein at least one control event comprises a control event for altering the rendering of the content for display,
wherein the source client is configured to cause sending of the control events when the apparatus is the host, the control events being sent to enable the members to thereafter process at least one control event to alter the rendering of the content for display by the respective members, and
wherein the source client is configured to receive control events from the conferencing server when the apparatus is a member, the source client receiving the control events to enable at least one of the source client or another application operated by the processor to process at least one control event to alter the rendering of the content for display by the apparatus.

20. An apparatus according to claim 19, wherein the apparatus and destinations are configured to render the same content for display,
   wherein the source client is configured to cause presentation of a user interface when the apparatus is the host such that a user is capable of directing at least one of the source client or another application operated by the processor to alter the rendering of the content for display, wherein the at least one of the source client or the other application is directable to alter the rendering to enable the rendering of the content to be altered for display by the host, and to enable the source client to send the control events to permit the members to similarly alter the rendering by the respective members at least partially in synch with the apparatus.

21. An apparatus according to claim 14, wherein the source client is configured to cause transfer of the content to enable the conferencing server to receive the content, store the content, and thereafter transfer the content to the destinations, the destinations being configured to store the content at least one of before or after the conference session is established.

22. An apparatus according to claim 21, wherein the source client is configured to cause transfer of the content and addresses of the destinations, wherein the source client is configured to cause transfer of the content and the addresses of the destinations to enable the conferencing server to signal the destinations based upon the destination addresses, and to enable the conferencing server to transfer the content to the destinations in response to receiving requests from the destinations, the requests being in response to the conferencing server signaling the destinations.

23. An apparatus according to claim 22, wherein the source client is configured to receive the addresses of the destinations including an address of the mobile terminal, the mobile terminal address comprising one of a mobile telephone number or a Session Initiation Protocol (SIP) address.

24. An apparatus according to claim 22, wherein the source client is configured to cause transfer of the content and the address of the mobile terminal to the conferencing server to enable the conferencing server to signal the mobile terminal at least partially across a wireless network.

25. An apparatus according to claim 24, wherein the source client is configured to cause transfer of the content and the address of the mobile terminal to the conferencing server to enable the conferencing server to signal the mobile terminal in accordance with the Short Messaging Service (SMS).

26. An apparatus according to claim 24, wherein the source client is configured to cause transfer of the content and the address of the mobile terminal to the conferencing server to enable the conferencing server to signal the mobile terminal in accordance with the Session Initiation Protocol (SIP).

27. An apparatus comprising at least one processor and at least one memory including computer program code, the at least one memory and the computer program code configured to, with the at least one processor, cause the apparatus at least to perform:
   cause establishment of a conference session between a plurality of conference participants, the participants including a source and at least one destination that are each configured to store content, the source including printer driver program code configured to reformat the content into an intermediate format before the respective reformatted content is stored by the destinations and the apparatus being caused to perform reformatting the content from the intermediate format into a vectorized format, wherein the source is configured to operate in a fixed network environment, and at least one of the destinations comprises a mobile terminal configured to operate in a wireless network environment, wherein one of the participants is a host of the conference session and the other participants are members of the conference session, wherein the apparatus is caused to perform receiving at least one control event from the host, and thereafter being caused to perform directing transferring of the control events to the members to cause the members to render the content stored by the respective members in response to and in accordance with the control events, the control events directing the rendering of respective content, and provide for zooming or panning within the rendered content at the members, independent of the control events;
   wherein the apparatus is caused to perform receiving the content from the source, cause storing of the content, and thereafter cause transfer of the content to the destinations; and
   wherein the source, the at least one destination, the conferencing server, the host, and the members each comprise circuitry.

28. An apparatus according to claim 27, wherein the processor is configured to receive the control events from the source at least partially across a fixed network, and configured to cause transfer of the control events to the mobile terminal at least partially across a wireless network, when the source is the host and the mobile terminal is a member.

29. An apparatus according to claim 28, wherein the processor is configured to receive the control events from the mobile terminal at least partially across the wireless network, and configured to cause transfer of the control events to the source at least partially across the fixed network, when the mobile terminal is the host and the source is a member.

30. An apparatus according to claim 27, wherein the processor is configured to receive a control event to render the content for display, and wherein the processor is configured to cause transfer of the control events to enable the members to process at least one control event to render the content for display by the respective members.

31. An apparatus according to claim 30, wherein the processor is configured to receive a control event to render the content for display in response to the host presenting a user interface and receiving direction from a user, by means of the user interface, to render the content for display, the host being directed to render the content to enable the host to render the content for display by the host, and to enable the conferencing server to cause transfer of the control events to permit the members to similarly render the content for display by the respective members at least partially in synch with the host.

32. An apparatus according to claim 27, wherein the processor is configured to receive a control event to alter the rendering of the content for display, and wherein the processor is configured to cause transfer of the control events to enable the members to process at least one control event to alter the rendering of the content for display by the respective members.

33. An apparatus according to claim 32, wherein the host and destinations are configured to render the same content for display, wherein the processor is configured to receive a control event to render the content for display in response to the host presenting a user interface and receiving direction from a user, by means of the user interface, to alter the rendering of the content for display, the host being directed to render the content to enable the host to alter the rendering by the host, and to enable the conferencing server to cause transfer of the control events to permit the members to similarly alter the rendering by the respective members at least partially in synch with the host.

34. An apparatus according to claim 27, wherein the processor is configured to cause transfer of the content to the destinations to enable the destinations to store the content at least one of before or after the processor establishes the conference session.

35. An apparatus according to claim 34, wherein the processor is configured to receive and cause storing of the content and addresses of the destinations, and wherein the processor is configured to cause signaling to the destinations based upon the addresses of the destinations, the signaling including information required to access the content, and wherein the processor is configured to cause transfer of the content to the destinations in response to receiving requests from the destinations, the requests being in response to the processor signaling the destinations.

36. An apparatus according to claim 35, wherein the processor is configured to receive and cause storing of the addresses of the destinations including an address of the mobile terminal, the mobile terminal address comprising one of a mobile telephone number or a Session Initiation Protocol (SIP) address.

37. An apparatus according to claim 35, wherein the processor is configured to cause signaling to the terminal at least partially across a wireless network.

38. An apparatus according to claim 37, wherein the processor is configured to cause signaling to the mobile terminal in accordance with the Short Messaging Service (SMS).

39. An apparatus according to claim 37, wherein the processor is configured to cause signaling to the mobile terminal in accordance with the Session Initiation Protocol (SIP).

40. An apparatus comprising at least one processor and at least one memory including computer program code, the at least one memory and the computer program code configured to, with the at least one processor, cause the apparatus at least to perform:
   operating a client, as program code, in a conference session between a plurality of participants via a conferencing server configured to reformat content from an intermediate format into a vectorized format, the participants each being configured to store content, wherein the participants include a source operating in a fixed network environment, and include at least one destination, wherein at least one of the destinations comprises the apparatus, wherein one of the participants is a host of the conference session and the other participants are members of the conference session,
   wherein the client is configured to receive content from the source via the conferencing server, the source including printer driver program code configured to reformat the content into an intermediate format and the conferencing server being configured to reformat the content from the intermediate format into a vectorized format before receipt of the respective reformatted content by the client,
   wherein the client is configured to cause sending of at least one control event to the conferencing server when the apparatus is the host, the control events being sent to enable the conferencing server to thereafter transfer the control events to the members, and to cause the members to thereafter render the content stored by the respective members in response to and in accordance with the control events, the control events directing the rendering of respective content, and provide for zooming or panning within the rendered content at the members, independent of the control events,
   wherein the client is configured to receive control events from the conferencing server when the apparatus is a member, the conferencing server having received the control events from the host, the client receiving the control events to enable at least one of the client or another application operated by the at least one processor as program code to render the content in response to and in accordance with the control events; and
   wherein the participants, the source, the one of the at least one destinations, the conferencing server, the host, and the members each comprise circuitry.

41. An apparatus according to claim 40, wherein the client is configured to cause sending of the control events to the conferencing server at least partially across a wireless network to enable the conferencing server to transfer the control events to the source at least partially across a fixed network when the apparatus is the host and the source is a member.

42. An apparatus according to claim 41, wherein the client is configured to receive the control events from conferencing server at least partially across the wireless network, the conferencing server having received the control events from the source at least partially across the fixed network, when the source is the host and the apparatus is a member.

43. An apparatus according to claim 40, wherein at least one control event comprises a control event for rendering the content for display,
   wherein the client is configured to cause sending of the control events when the apparatus is the host, the control events being sent to enable the members to thereafter process at least one control event to render the content for display by the respective members, and
   wherein the client is configured to receive control events from the conferencing server when the apparatus is a member, the client receiving the control events to enable at least one of the client or another application operated by the at least one processor to process at least one control event to render the content for display by the apparatus.

44. An apparatus according to claim 43, wherein the client is configured to cause presentation of a user interface when the apparatus is the host such that a user is capable directing at least one of the client or another application operated by the at least one processor, by means of the user interface, to render the content for display, wherein the at least one of the client or the other application is directable to render the content to enable the content to be rendered for display by the apparatus, and to enable the client to send the control events to permit the members to similarly render the content for display by the respective members at least partially in synch with the apparatus.

45. An apparatus according to claim 40, wherein at least one control event comprises a control event for altering the rendering of the content for display, wherein the client is configured to cause sending of the control events when the apparatus is the host, the control events being sent to enable the members to thereafter process at least one control event to alter the rendering of the content for display by the respective members, and wherein the client is configured to receive control events from the conferencing server when the apparatus is a member, the client receiving the control events to enable at least one of the client or another application operated by the at least one processor to process at least one control event to alter the rendering of the content for display by the apparatus.

46. An apparatus according to claim 45, wherein the client is configured to cause presentation of a user interface when the apparatus is the host such that a user is capable of directing at least one of the client or another application operated by the at least one processor, by means of the user interface, to render the content for display, wherein the at least one of the client or the other application is directable to render the content to enable the content to be rendered for display by the apparatus, and to enable the client to send the control events to permit the members to similarly render the content for display by the respective members at least partially in synch with the apparatus.

47. An apparatus according to claim 40, wherein the client is configured to receive the content from the source and cause storing of the content in a memory at least one of before or after the conference session is established, the client receiving the content via the conferencing server in response to the conferencing server receiving and storing the content from the source.

48. An apparatus according to claim 47, wherein the client is signalable by a conferencing server based upon an address of the apparatus, the signaling including information required to access the content, wherein the client is signalable in response to the conferencing server receiving the content and address of the apparatus from the source, and wherein the client is configured to receive the content including sending a request to the conferencing server in response to the conferencing server signaling the client, and thereafter download the content from the conferencing server.

49. An apparatus according to claim 48, wherein the client is signalable in response to the conferencing server receiving an address of the apparatus comprising one of a mobile telephone number or a Session Initiation Protocol (SIP) address.

50. An apparatus according to claim 48, wherein the client is signalable at least partially across a wireless network.

51. An apparatus according to claim 50, wherein the client is signalable in accordance with the Short Messaging Service (SMS).

52. An apparatus according to claim 50, wherein the client is signalable in accordance with the Session Initiation Protocol (SIP).

53. A method comprising:
 causing establishment of a conference session between a plurality of participants, the participants including a source and at least one destination that are each configured to store content, wherein the source is configured to operate in a fixed network environment, and at least one of the destinations comprises a mobile terminal configured to operate in a wireless network environment, wherein the conference session is established via a conferencing server between the source and the destinations, and wherein one of the participants is a host of the conference session and the other participants are members of the conference session;
 receiving the content at the conferencing server from the source, and thereafter causing transfer of the content from the conferencing server to the destinations, the source including printer driver program code configured to reformat the content into an intermediate format before the respective reformatted content is transferred to the destinations and the conferencing server being configured to reformat the content from the intermediate format into a vectorized format;
 receiving at least one control event at the conferencing server from the host; and
 causing transfer of the control events from the conferencing server to the members to cause the members to render the content stored by the respective members in response to and in accordance with the control events, the control events directing the rendering of respective content, and provide for zooming or panning within the rendered content at the members, independent of the control events; and
 wherein the participants, the source, the at least one destination, the conferencing server, the host, and the members each comprise circuitry.

54. A method according to claim 53, wherein the control events are received at the conferencing server from the source at least partially across a fixed network, and transfer of the control events is caused from the conferencing server to the mobile terminal at least partially across a wireless network, when the source is the host and the mobile terminal is a member.

55. A method according to claim 54, wherein the control events are received at the conferencing server from the mobile terminal at least partially across the wireless network, and transfer of the control events is caused from the conferencing server to the source at least partially across the fixed network, when the mobile terminal is the host and the source is a member.

56. A method according to claim 53, wherein receiving the control events comprises receiving a control event to render the content for display, and wherein causing transfer of the control events comprises causing transfer of the control events to enable the members to process at least one control event to render the content for display by the respective members.

57. A method according to claim 56, wherein receiving the control events comprises receiving a control event to render the content for display in response to the host presenting a user interface and receiving direction from a user, by means of the user interface, to render the content for display, the host being directed to render the content to enable the host to render the content for display by the host, and to enable the conferencing server to receive and cause transfer of the control events to permit the members to similarly render the content for display by the respective members at least partially in synch with the host.

58. A method according to claim 53, wherein receiving the control events comprises receiving a control event to alter the rendering of the content for display, and wherein causing transfer of the control events comprises causing transfer of the control events to enable the members to process at least one control event to alter the rendering of the content for display by the respective members.

59. A method according to claim 58, wherein the host and destinations are configured to render the same content for display, wherein receiving the control events comprises receiving a control event to render the content for display in response to the host presenting a user interface and receiving direction from a user, by means of the user interface, to alter the rendering of the content for display, the host being directed to alter the rendering to enable the host to alter the rendering by the host, and to enable the conferencing server to receive and cause transfer of the control events to permit the members to similarly alter the rendering by the respective members at least partially in synch with the host.

60. A method according to claim 53, wherein receiving the content comprises receiving and causing storing of the content at the conferencing server from the source, and wherein causing transfer of the content comprises causing transfer of the content from the conferencing server to the destinations at least one of before or after establishing the conference session.

61. A method according to claim 60, wherein receiving and causing storing of the content comprises receiving and causing storing of the content and addresses of the destinations at the conferencing server from the source, wherein the method further comprises:
  causing signaling to the destinations from the conferencing server, the signaling including information required to access the content, and
  wherein causing transfer of the content comprises causing transfer of the content from the conferencing server to the destinations, the content being transferred in response to the conferencing server receiving requests from the destinations, the requests being in response to the conferencing server signaling the destinations.

62. A method according to claim 61, wherein receiving and causing storing of addresses of the destinations includes receiving and causing storing of an address of the mobile terminal, the address of the mobile terminal comprising one of a mobile telephone number or a Session Initiation Protocol (SIP) address.

63. A method according to claim 61, wherein causing signaling to the destinations includes causing signaling to the mobile terminal at least partially across a wireless network.

64. A method according to claim 63, wherein causing signaling to the mobile terminal comprises causing signaling to the mobile terminal in accordance with the Short Messaging Service (SMS).

65. A method according to claim 63, wherein causing signaling to the mobile terminal comprises causing signaling to the mobile terminal in accordance with the Session Initiation Protocol (SIP).

66. A computer program product comprising at least one non-transitory computer-readable storage medium having computer-readable executable code portions stored therein, the computer-readable executable code portions comprising:
  a first executable code portion for directing establishment of a conference session between a plurality of participants, the participants including a source and at least one destination that are each configured to store content, wherein the source is configured to operate in a fixed network environment, and at least one of the destinations comprises a mobile terminal configured to operate in a wireless network environment, wherein the conference session is established via a conferencing server between the source and the destinations, and wherein one of the participants is a host of the conference session and the other participants are members of the conference session;
  a second executable code portion for receiving the content at the conferencing server from the source, and thereafter causing transfer of the content from the conferencing server to the destinations, the source including printer driver program code configured to reformat the content into an intermediate format before the respective reformatted content is transferred to the destinations and the conferencing server being configured to reformat the content from the intermediate format into a vectorized format;
  a third executable code portion for receiving at least one control event at the conferencing server from the host; and
  a fourth executable code portion for causing transfer of the control events from the conferencing server to the members to cause the members to render the content stored by the respective members in response to and in accordance with the control events, the control events directing the rendering of respective content, and provide for zooming or panning within the rendered content at the members, independent of the control events;
  wherein the participants, the source, the at least one destination, the conferencing server, the host, and the members each comprise circuitry.

67. A computer program product according to claim 66, wherein the third executable code portion is configured to receive the control events from the source at least partially across a fixed network, and the fourth executable code portion is configured to cause transfer of the control events to the mobile terminal at least partially across a wireless network, when the source is the host and the mobile terminal is a member.

68. A computer program product according to claim 67, wherein the third executable code portion is configured to receive the control events from the mobile terminal at least partially across the wireless network, and the fourth executable code portion is configured to cause transfer of the control events to the source at least partially across the fixed network, when the mobile terminal is the host and the source is a member.

69. A computer program product according to claim 66, wherein the third executable code portion is configured to receive a control event to render the content for display, and wherein the fourth executable code portion is configured to cause transfer of the control events to enable the members to process at least one control event to render the content for display by the respective members.

70. A computer program product according to claim 69, wherein the third executable code portion is configured to receive a control event to render the content for display in response to the host presenting a user interface and receiving direction from a user, by means of the user interface, to render the content for display, the host being directed to render the content to enable the host to render the content for display by the host, and to enable the third and fourth executable portions to receive and cause transfer of the control events to permit the members to similarly render the content for display by the respective members at least partially in synch with the host.

71. A computer program product according to claim 66, wherein the third executable code portion is configured to receive a control event to alter the rendering of the content for display, and wherein the fourth executable code portion is configured to cause transfer of the control events to enable the members to process at least one control event to alter the rendering of the content for display by the respective members.

72. A computer program product according to claim 71, wherein the host and destinations are configured to render the same content for display, wherein the third executable code portion is configured to receive a control event to render the content for display in response to the host presenting a user interface and receiving direction from a user, by means of the user interface, to alter the rendering of the content for display, the host being directed to alter the rendering to enable the host to alter the rendering by the host, and to enable the third and fourth executable code portions to receive and cause transfer of the control events to permit the members to similarly alter the rendering by the respective members at least partially in synch with the host.

73. A computer program product according to claim 66, wherein the second executable code portion is configured to receive and cause storing of the content from the source, and thereafter cause transfer of the content to the destinations at least one of before or after establishing the conference session.

74. A computer program product according to claim 73, wherein the second executable code portion is configured to receive and cause storing of the content and addresses of the destinations, wherein the computer program product further comprises:

a fifth executable code portion for causing signaling to the mobile terminal, the signaling including information required to access the content, and wherein the second executable code portion is configured to cause transfer of the content to the mobile terminal, the content being transferred in response to receiving requests from the destinations, the requests being in response to the fifth executable portion signaling the destinations.

75. A computer program product according to claim 74, wherein the second executable code portion is configured to receive and cause storing of addresses of the destinations including an address of the mobile terminal, the address of the mobile terminal comprising one of a mobile telephone number or a Session Initiation Protocol (SIP) address.

76. A computer program product according to claim 74, wherein the fifth executable code portion is configured to cause signaling to the mobile terminal at least partially across a wireless network.

77. A computer program product according to claim 76, wherein the fifth executable code portion is configured to cause signaling to the mobile terminal in accordance with the Short Messaging Service (SMS).

78. A computer program product according to claim 76, wherein the fifth executable code portion is configured to cause signaling to the mobile terminal in accordance with the Session Initiation Protocol (SIP).

79. A system for directing the rendering of content, the system comprising:

a plurality of conference participants, the participants including a source and at least one destination, wherein the source comprises a mobile terminal configured to operate in a wireless network environment, wherein at least one of the destinations is configured to operate in a fixed network environment, and at least one of the destinations is configured to operate in the wireless network environment; and a conferencing server configured to communicate with the source and the destinations, wherein the source is configured to transfer content to the destinations via the conferencing server, the source including printer driver program code configured to reformat the content into an intermediate format before the respective reformatted content is transferred to the destinations and the conferencing server being configured to reformat the content from the intermediate format into a vectorized format, wherein the conferencing server is configured to establish a conference session between the plurality of participants, wherein one of the participants is a host of the conference session and the other participants are members of the conference session, wherein the conferencing server is configured to receive at least one control event from the host and transfer the control events to the members, and wherein the control events direct rendering of the content transferred to the destinations, and provide for zooming or panning within the rendered content at the members, independent of the control events;

wherein the participants, the source, the at least one destination, and the conferencing server each comprise circuitry.

* * * * *